United States Patent
Knijnik et al.

(10) Patent No.: US 11,222,369 B1
(45) Date of Patent: Jan. 11, 2022

(54) SYSTEMS AND METHODS FOR OPTIMIZATION OF CAPITAL ALLOCATION FOR ADVERTISING CAMPAIGNS IN ONLINE-BASED COMMERCE

(71) Applicants: Daniel Knijnik, Old Greenwich, CT (US); Anibal Knijnik, Porto Alegre (BR); Eduardo Knijnik, Riverside, CT (US); Alexandre Dorbleo Ely, Botucatu (BR)

(72) Inventors: Daniel Knijnik, Old Greenwich, CT (US); Anibal Knijnik, Porto Alegre (BR); Eduardo Knijnik, Riverside, CT (US); Alexandre Dorbleo Ely, Botucatu (BR)

(73) Assignee: Quartile Digital, Inc., New York, NY (US)

( * ) Notice: Subject to any disclaimer, the term of this patent is extended or adjusted under 35 U.S.C. 154(b) by 0 days.

(21) Appl. No.: 17/222,883

(22) Filed: Apr. 5, 2021

Related U.S. Application Data

(63) Continuation-in-part of application No. 16/249,465, filed on Jan. 16, 2019, now Pat. No. 10,970,742.

(60) Provisional application No. 62/617,659, filed on Jan. 16, 2018.

(51) Int. Cl.
*G06Q 30/02* (2012.01)
*G06N 20/00* (2019.01)

(52) U.S. Cl.
CPC ......... *G06Q 30/0276* (2013.01); *G06N 20/00* (2019.01); *G06Q 30/0275* (2013.01); *G06Q 30/0277* (2013.01)

(58) Field of Classification Search
CPC ........... G06Q 30/0276; G06Q 30/0275; G06Q 30/0277; G06N 20/00

USPC ...................................................... 705/14.51
See application file for complete search history.

(56) References Cited

U.S. PATENT DOCUMENTS 10,915,929 B1    2/2021   Huang

FOREIGN PATENT DOCUMENTS

WO    WO-2016007382 A1 *  1/2016  ......... G06F 16/3337

OTHER PUBLICATIONS

Sunil Gupta, Allocating Marketing Resources, 2008 (Year: 2008).*
Office Action dated Apr. 23, 2021 in connection with U.S. Appl. No. 16/281,420.

* cited by examiner

*Primary Examiner* — Tarek Elchanti

(57) ABSTRACT

A method and associated system of producing an advertising campaign of a product for an online marketplace seller including, under control of one or more processors configured with executable instructions, generating a single keyword advertising campaign of the product; collecting data on the single keyword; executing a machine learning component of an adaptive machine learning platform to generate a machine learning component output based at least in part on the data on the single keyword; generating a behavioral curve or table relating to an advertisement bid value and a cost per click value based at least in part on the machine learning component output; generating sales goal(s) of the product for the online marketplace seller on the online marketplace; generating an optimized advertisement bid value based at least in part on the sales goal(s) and the behavioral curve or table; and generating an optimized advertising campaign therefrom.

20 Claims, 19 Drawing Sheets

| Targets ==> # Sales = 20, maximum ACoS = 27% |||
|---|---|---|
| Solution | ACoS | # of Sales |
| 1 | 34% | 20 |
| 2 | 27% | 17 |

Fig. 17

Keyword 1

| BID ($) | CPC | # Clicks | Ads Spending | Conv Rate | # Sales Expected | Unit Sale Price | Total Sales | Average Cost of Sale | ACoS |
|---|---|---|---|---|---|---|---|---|---|
| 3.00 | 1.93 | 200 | 386.00 | 25.00% | 50.00 | 25.00 | 1,250.00 | 7.72 | 30.9% |
| 2.75 | 1.91 | 180 | 343.80 | 25.50% | 45.90 | 25.00 | 1,147.50 | 7.49 | 30.0% |
| 2.50 | 1.88 | 165 | 309.38 | 26.00% | 42.90 | 25.00 | 1,072.50 | 7.21 | 28.8% |
| 2.25 | 1.85 | 155 | 285.98 | 25.50% | 39.53 | 25.00 | 988.13 | 7.24 | 28.9% |
| 2.00 | 1.74 | 142 | 247.08 | 23.75% | 33.73 | 25.00 | 843.13 | 7.33 | 29.3% |
| 1.75 | 1.59 | 125 | 199.06 | 23.00% | 28.75 | 25.00 | 718.75 | 6.92 | 27.7% |
| 1.50 | 1.41 | 95 | 133.95 | 22.00% | 20.90 | 25.00 | 522.50 | 6.41 | 25.6% |
| 1.25 | 1.20 | 40 | 48.00 | 21.00% | 8.40 | 25.00 | 210.00 | 5.71 | 22.9% |
| 1.00 | 0.97 | 23 | 22.31 | 20.43% | 4.70 | 25.00 | 117.50 | 4.75 | 19.0% |

Keyword 2

| BID ($) | CPC | # Clicks | Ads Spending | Conv Rate | # Sales Expected | Unit Sale Price | Total Sales | Average Cost of Sale | ACoS |
|---|---|---|---|---|---|---|---|---|---|
| 2.50 | 1.61 | 135 | 217.13 | 23.75% | 32.06 | 25.00 | 801.56 | 6.77 | 27.1% |
| 2.25 | 1.56 | 112 | 175.03 | 23.00% | 25.76 | 25.00 | 644.00 | 6.79 | 27.2% |
| 2.00 | 1.50 | 98 | 147.00 | 22.00% | 21.56 | 25.00 | 539.00 | 6.82 | 27.3% |
| 1.75 | 1.44 | 73 | 104.76 | 21.00% | 15.33 | 25.00 | 383.25 | 6.83 | 27.3% |
| 1.50 | 1.31 | 65 | 84.83 | 18.00% | 11.70 | 25.00 | 292.50 | 7.25 | 29.0% |
| 1.25 | 1.14 | 55 | 62.56 | 17.50% | 9.63 | 25.00 | 240.63 | 6.50 | 26.0% |
| 1.00 | 0.94 | 43 | 40.42 | 17.50% | 7.53 | 25.00 | 188.13 | 5.37 | 21.5% |
| 0.75 | 0.85 | 34 | 28.90 | 16.00% | 5.44 | 25.00 | 136.00 | 5.31 | 21.3% |
| 0.70 | 0.68 | 22 | 14.94 | 15.00% | 3.30 | 25.00 | 82.50 | 4.53 | 18.1% |

| Target (Keyword or ASIN) | Daily Volume | Type (Keyword or Product) |
|---|---|---|
| digital alarm clock | 2977 | Keyword |
| Product 1 | 2308 | Product |
| Product 2 | 1674 | Product |
| digital alarm clock for bedroom | 1505 | Keyword |
| jall wooden digital alarm clock | 1244 | Keyword |
| Product 3 | 950 | Product |
| projection digital alarm clock | 541 | Keyword |

Fig. 27

SYSTEMS AND METHODS FOR OPTIMIZATION OF CAPITAL ALLOCATION FOR ADVERTISING CAMPAIGNS IN ONLINE-BASED COMMERCE

CROSS-REFERENCE TO RELATED APPLICATIONS

The present application claims priority to U.S. Provisional Patent Application No. 62/617,659, filed Jan. 16, 2018, and is a continuation-in-part of U.S. Non-Provisional patent application Ser. No. 16/249,465, filed Jan. 16, 2019, the disclosures and teachings of which are incorporated herein by reference.

TECHNICAL FIELD

The present invention relates to systems and methods for optimizing capital allocation for advertising campaigns in the online-based commercial environment to achieve pre-defined sales goals while respecting inventory, advertising cost of sales, and advertising budget constraints in an autonomous manner.

BACKGROUND OF THE INVENTION

Selling goods through online marketplaces is becoming an increasingly important activity for retailers. The share of Internet sales in the total retail commerce space is continuously growing. E-commerce retailers, i.e., retailers that sell mainly through the Internet, face numerous challenges in managing their businesses, with one such challenge being obtaining a balanced ratio for every Universal Product Code (UPC) between advertising expenditure of an advertising campaign and the actual sales achieved through this campaign.

There are many aspects to consider regarding this balancing ratio, as the process of advertising is composed of at least some of these four basic steps:

1. Launching a campaign for a UPC through a search engine based on a list of words automatically generated by the marketplace, i.e., an automatic campaign. While a word is the most commonly-used target, a product target may also be utilized in connection with the present system and method disclosed herein. This list of words in the automatic campaign is proposed by the marketplace using its metrics and algorithms and are intended to catch the attention of potential customers looking for that particular UPC. The retailer bids a predefined maximum value to pay per click—the CPC or cost per click—and stipulates a maximum daily value to spend for the duration of the campaign.
2. Analyzing the results of that campaign regarding the number of impressions and clicks for each word, the CPC, and the number of clicks per sale, if any. The actual CPC, which almost always is smaller than the bid, is also informed daily by the marketplace during the advertising campaign.
3. Refining the campaign by bidding a maximum value to pay for each click of selected words (e.g., keywords) from the aforementioned list of words.
4. Balancing the campaign by adjusting the bid value for each word towards the actual CPC to reduce the Advertising Cost of Sales (ACoS), which is the ratio in percentage points of advertising expenditure to the revenue from actual total sales value, for that UPC while maintaining an acceptable number of sales.

One of the main problems of this process is that it is unknown upfront which words, phrases, or expressions will effectively produce a sale. Additionally, this process of selecting words, phrases, or expressions, i.e., refining, is typically performed manually by individuals analyzing word lists informed by the online marketplace, which is expensive, time-consuming, and demands a heavy amount of skilled manpower.

Search engines usually charge per click, so that its goal is to launch an automatic campaign with the broadest set of words related to the UPC, as it does not know in advance which word will attract the attention of the customer. For instance, for the UPC "Pet Stairs," a click can be obtained, among others, through the words "Pet," "Stairs," "Pet Stairs," "Dog stairs," "Cat stairs," "Stairs for pets," etc. The retailer is charged for every click, receiving information from the search engine on the word or phrase that generated the charged click.

The broadness of automatic campaigns makes them expensive, so it is desirable, for the sake of economy, to keep them as simple as viable, continuously selecting from the list of clicked words those most promising regarding sale generation, e.g., keywords.

In sequence, the seller launches a specific advertising campaign in the marketplace using that selected list of words, placing a bid (maximum CPC value acceptable to pay) on each of the selected keywords. The marketplace proceeds with a word auction, selecting from the bids (and other metrics related to the seller) the one that will appear in the first place for the customers and returns to the seller with the actual charged value per click for the bid keyword. Appearing before competitors increases the chance of achieving a sale.

The other metrics being equivalent per marketplace criteria, it is obvious that the higher the bid, the higher the chance for the bidder to appear in first place. However, one point to keep in mind is that the higher the bid, the higher the ACoS, such that the difficulty of the decision-making process is to find the fair bidding—the one click cost that balances the extra advertising spending with an adequate increase in sales revenue.

Bidding higher can increase sales, but can also lead to a smaller profit, as the ACoS will be higher and there is no linear relationship between increase in ACoS and increase in sales revenue. It is possible that the net income and the gross margin may become even smaller.

On the other hand, saving on advertising spending by reducing the bid on the marketplace auction can have a great impact on the sales speed and revenue, leaving a smaller profit, reducing the number of sales, and ultimately reflecting adversely on ratings and reviews.

Optimization of the process of designing an advertising campaign, with all its subtleties and mutual influences between intervening factors, is a challenging process. It demands a great deal of attention from the seller, as the purpose is not only to simply guess the fair value for the bid, but also to consider all the involved factors and to come to a fair bidding price—the one that increases the net revenue with as little influence on the gross margin as possible. This optimization for one product in the seller's portfolio on a daily basis demands a lot of work, attention, and skill, and manually performing this optimization daily for hundreds or thousands of products in the seller's portfolio is almost impossible.

SUMMARY OF THE INVENTION

The tool being presented is an automated, or autonomous, optimization process aiming to reduce both the time and cost of achieving a balanced advertising campaign for a product in which the bid for any particular word is automatically calculated such that the ACoS does not exceed a defined value, in percentage points, while achieving predefined sales goals and respecting inventory and budget constraints with no need for human intervention.

The pre-defined ACoS may be either the ACoS for the campaign, which may be defined as the ratio of advertising spending to the advertisement-generated sales volume, or the overall ACoS, i.e., the ACoS for the seller as a whole. The overall ACoS is calculated as the ratio as a percentage between the overall advertising spending of the seller and the total revenue from sales, i.e., both organic sales and advertisement-generated sales.

The present invention optimizes ad spending, autonomously choosing how much to bid on the marketplace for each keyword to generate an amount of sales based on the bid according to CPC/bid behavioral curves. It automatically integrates the purchase and sales process, splitting the sales goals in organic sales goal and ad-generated sales goal.

The proposed tool is capable of accessing and utilizing application programming interface (API) data from the online marketplaces that constitutes a report or reports in the form of, for example, a table, or a continuous streaming of data with all the words used in the automatic campaign, e.g., keywords, their click-through (if any), and the number of sales generated by those clicks (if any). The marketplace may update such report or table in real time, such that the tool is capable of accessing such report, or streamed data, in real-time as well. In other words, the report, streamed data, or table may be sent continuously in real time to the tool. In one exemplary embodiment, the tool may receive a report summary every time the online marketplace performs an update. Such report summary may include the latest information regarding the current words used in the automatic campaign, their current click-through (if any) and the current number of sales generated by those clicks (if any). As such, it is possible that the tool may access or receive multiple report summaries in a given time period. In another exemplary embodiment, the tool maintains its own table that includes at least some of the same information that is in the table maintained by the online marketplace, such that when the online marketplace updates its own table in real time, the tool also updates its own table simultaneously by accessing or receiving the updates made by the online-marketplace in real time.

Based on the data in this report, e.g., table, or streamed data, the tool may perform one or more of the steps in the process of word screening (described in-detail later), in which the tool, for example, selects which words to forego as not promising, and which words to promote and use in a Single Keyword Campaign (SKwC). It also selects which words to watch, keeping them in standby and not foregoing or promoting them in an SKwC until a further increase in the statistical relevance of the word makes a decision possible on whether to negativize or promote it. This process of word selection is preferably fully automated, making it possible to manage the advertising campaign of many UPCs. If desired by the seller, the process can be used in a non-automated manner, in which there is an additional step of manually deciding the action to be taken regarding each word: negativize, promote, or hold in standby.

It should be noted that an advantage of having access to the API data in real time is that the tool is not required to wait until the advertising campaign ends to make a decision regarding which words to forego as not promising and which words to promote for use in a SKwC. For example, it may be clear after the first few hours, in the automatic campaign that is expected to last a week, from the report or table that is accessed or received in real time by the tool, that at least one of the words should be foregone and at least one of the words should be promoted for use in an SKwC. As such, the tool may prematurely end the automated campaign thereby preventing any further unnecessary costs and saving the user time and increasing the chance of achieving more sales through the SKwC of the promoted keywords.

The results of the automatic campaign generated by the online marketplace are continuously analyzed by comparing the value of the bid, the price paid for each click (CPC), the click-through defined as the ratio of the number of clicks to the number of impressions, the number of sales (NOS) during the campaign, and the ACoS (Advertising Cost of Sale) obtained. If both values, the bid and the actual CPC, are close to each other, no change is taken in the advertising campaign and the campaign is resumed. If there is a significant gap between those values, the system algorithm defines a new value for the bid, smaller than the actual CPC. A new campaign is launched, using the new bid value. The new CPC is recorded, the new actual NOS is retrieved and stored, and the new ACoS is calculated. This cycle continues until there is no significant change in ACoS between two cycles of the campaign.

Moving forward, the system begins calculating both the sales amount obtained through organic sales, i.e., sales that did not happen through paid clicking on the marketplace, and the sales amount obtained through the advertising effort, i.e., advertisement-generated sales.

One of the greatest issues in planning and implementing advertising campaigns in the marketplace is how to increase the efficiency of overall sales respecting an advertising expenditure ceiling and how to consider the influence of this evolution of the sales volume on the inventory, such that the seller will not be overstocked or sell out. This consideration of mutual influences further points to the use of a robust tool to forecast actual sales numbers.

The present invention accomplishes this through a sophisticated statistical analysis of the efficiency of each word in the advertising campaign such that it is possible to forecast, with an acceptable confidence level, how to better assign the desired advertising resources to each word to guarantee the intended sales volume for the relevant UPC.

In general, in one aspect, the invention features a method of producing an advertising campaign of a product for an online marketplace seller including, under control of one or more processors configured with executable instructions, generating at least one automated advertising campaign of a product having an online marketplace listing with an online marketplace; collecting data on one or more keywords used in relation to the at least one automated advertising campaign, the data including an initial set of daily clicks or sales on the online marketplace listing; generating a single keyword advertising campaign of the product, where a single keyword of the single keyword advertising campaign is selected from the one or more keywords at least in part on the basis of the initial set of daily clicks or sales on the online marketplace listing; collecting data on the single keyword used in relation to the single keyword advertising campaign, the data including a second set of daily clicks or sales on the online marketplace listing; executing a machine learning component of an adaptive machine learning platform to generate a machine learning component output, where the machine learning component output is generated based at least in part on the data on the single keyword used in relation to the single keyword advertising campaign; generating a behavioral curve or table relating to an advertisement bid value of the online marketplace listing and a cost per click value associated with the online marketplace listing based at least in part on the machine learning component output of the machine learning component; generating one or more sales goals of the product for the online marketplace seller on the online marketplace; generating an optimized advertisement bid value based at least in part on the one or more sales goals and the behavioral curve or table; and generating an optimized advertising campaign of the product based at least in part on the optimized advertisement bid value.

Implementations of the invention may include one or more of the following features. The at least one automated advertising campaign may be generated for use in the online marketplace. The data on one or more keywords used in relation to the at least one automated advertising campaign may further include one or more of a number of impressions relating to the online marketplace listing, a total number of clicks on the online marketplace listing, a click-through rate, a conversion rate, a total number of advertisement-generated sales of the product, a total number of organic sales of the product, and a total number of sales of the product through the online marketplace listing. The single keyword of the single keyword advertising campaign may be selected from the one or more keywords at least in part on the basis of a conversion rate and an advertising unit cost of sale. The one or more keywords may be one or more of a word, an exact phrase, an exact expression, and combinations thereof. The machine learning component output may be generated at least in part on one or more of a number of impressions relating to the online marketplace listing, a cost per click for the online marketplace listing, a total number of clicks on the online marketplace listing, a conversion rate, a total number of advertisement-generated sales of the product, a total number of organic sales of the product, a total number of sales of the product through the online marketplace listing, and an advertising unit cost of sale.

The method may further include collecting additional data on the single keyword used in relation to the single keyword advertising campaign, the data including a third set of daily clicks or sales on the online marketplace listing; executing a machine learning component of an adaptive machine learning platform to generate a second machine learning component output, where the second machine learning component output is generated based at least in part on the additional data on the single keyword used in relation to the single keyword advertising campaign; generating a second behavioral curve or table relating to an advertisement bid value of the online marketplace listing and a cost per click value associated with the online marketplace listing based at least in part on the second machine learning component output of the machine learning component; generating a second optimized advertisement bid value based at least in part on the one or more sales goals and the second behavioral curve or table; and generating a second optimized advertising campaign of the product based at least in part on the second optimized advertisement bid value. The one or more sales goals may be generated at least in part on the basis of an actual inventory level of the product, a forecasted inventory level of the product, or both. The optimized advertisement bid value may be generated based at least in part on a simulation of a number of sales of the product and an advertising unit cost of sale of the product performed on all available advertisement bid values for all available keywords relating to the product. The single keyword advertising campaign of the product may be generated as including one or more automated safeguards, said one or more automated safeguards including limiting a maximum advertisement bid value in relation to a set value or a value of a sales price of the product. The optimized advertisement bid value may be generated based at least in part on one or more of a target advertising cost of sale, a total number of organic sales of the product, a total number of sales of the product through the online marketplace listing, a total number of organic sales of the product through the online marketplace listing, and a conversion rate of the product through the online marketplace listing.

In general, in another aspect, the invention features a system configured to produce an advertising campaign of a product for an online marketplace seller, including one or more processors, one or more computer-readable media, and one or more modules maintained on the one or more computer-readable media that, when executed by the one or more processors, cause the one or more processors to perform operations including generating at least one automated advertising campaign of a product having an online marketplace listing with an online marketplace; collecting data on one or more keywords used in relation to the at least one automated advertising campaign, the data including an initial set of daily clicks or sales on the online marketplace listing; generating a single keyword advertising campaign of the product, where a single keyword of the single keyword advertising campaign is selected from the one or more keywords at least in part on the basis of the initial set of daily clicks or sales on the online marketplace listing; collecting data on the single keyword used in relation to the single keyword advertising campaign, the data including a second set of daily clicks or sales on the online marketplace listing; executing a machine learning component of an adaptive machine learning platform to generate a machine learning component output, where the machine learning component output is generated based at least in part on the data on the single keyword used in relation to the single keyword advertising campaign; generating a behavioral curve or table relating to an advertisement bid value of the online marketplace listing and a cost per click value associated with the online marketplace listing based at least in part on the machine learning component output of the machine learning component; generating one or more sales goals of the product for the online marketplace seller on the online marketplace; generating an optimized advertisement bid value based at least in part on the one or more sales goals and the behavioral curve or table; and generating an optimized advertising campaign of the product based at least in part on the optimized advertisement bid value.

Implementations of the invention may include one or more of the following features. The at least one automated advertising campaign may be generated for use in the online marketplace. The data on one or more keywords used in relation to the at least one automated advertising campaign may further include one or more of a number of impressions relating to the online marketplace listing, a total number of clicks on the online marketplace listing, a click-through rate, a conversion rate, a total number of advertisement-generated sales of the product, a total number of organic sales of the product, and a total number of sales of the product through the online marketplace listing. The single keyword of the single keyword advertising campaign may be selected from the one or more keywords at least in part on the basis of a conversion rate and an advertising unit cost of sale. The one or more keywords may be one or more of a word, an exact phrase, an exact expression, and combinations thereof. The machine learning component output may be generated at least in part on one or more of a number of impressions relating to the online marketplace listing, a cost per click for the online marketplace listing, a total number of clicks on the online marketplace listing, a conversion rate, a total number of advertisement-generated sales of the product, a total number of organic sales of the product, a total number of sales of the product through the online marketplace listing, and an advertising unit cost of sale.

The system may further include additional operations including collecting additional data on the single keyword used in relation to the single keyword advertising campaign, the data including a third set of daily clicks or sales on the online marketplace listing; executing a machine learning component of an adaptive machine learning platform to generate a second machine learning component output, where the second machine learning component output is generated based at least in part on the additional data on the single keyword used in relation to the single keyword advertising campaign; generating a second behavioral curve or table relating to an advertisement bid value of the online marketplace listing and a cost per click value associated with the online marketplace listing based at least in part on the second machine learning component output of the machine learning component; generating a second optimized advertisement bid value based at least in part on the one or more sales goals and the second behavioral curve or table; and generating a second optimized advertising campaign of the product based at least in part on the second optimized advertisement bid value. The one or more sales goals may be generated at least in part on the basis of an actual inventory level of the product, a forecasted inventory level of the product, or both. The optimized advertisement bid value may be generated based at least in part on a simulation of a number of sales of the product and an advertising unit cost of sale of the product performed on all available advertisement bid values for all available keywords relating to the product. The single keyword advertising campaign of the product may be generated as including one or more automated safeguards, said one or more automated safeguards including limiting a maximum advertisement bid value in relation to a set value or a value of a sales price of the product. The optimized advertisement bid value may be generated based at least in part on one or more of a target advertising cost of sale, a total number of organic sales of the product, a total number of sales of the product through the online marketplace listing, a total number of organic sales of the product through the online marketplace listing, and a conversion rate of the product through the online marketplace listing.

In another embodiment, the present invention may include a method of automatically producing an advertising campaign of a product for an online marketplace seller, the method performed by an application including one or more programs of instruction embodied in a non-transitory computer readable medium and executable by a processor to configure the application, comprising: generating at least one automated advertising campaign of a product having an online marketplace listing with an online marketplace; obtaining, in real time, a keyword table from the online marketplace, the keyword table including one or more keywords used in relation to the at least one automated advertising campaign and keyword data in connection with each of the one or more keywords, the keyword table being updated in real time by the online marketplace; generating a single keyword advertising campaign of the product, wherein a single keyword of the single keyword advertising campaign is selected from the keyword table at least in part on the basis of the keyword data; collecting data on the single keyword used in relation to the single keyword advertising campaign, the data including a second set of daily clicks or sales on the online marketplace listing; executing a machine learning component of an adaptive machine learning platform to generate a machine learning component output, wherein the machine learning component output is generated based at least in part on the data on the single keyword used in relation to the single keyword advertising campaign; generating a behavioral curve or table relating to an advertisement bid value of the online marketplace listing and a cost per click value associated with the online marketplace listing based at least in part on the machine learning component output of the machine learning component; generating one or more sales goals of the product for the online marketplace seller on the online marketplace; generating a current advertisement bid value based at least in part on the one or more sales goals and the behavioral curve or table; generating a current advertising campaign of the product based at least in part on the optimized advertisement bid value; and generating an optimized advertisement bid value by continuously adjusting the current advertisement bid value until the current advertisement bid value has reached an optimized value, the continuous adjustment being performed by: collecting data on the optimized advertising campaign, the data including a set of sales on the online marketplace listing; generating an adjusted advertisement bid value based at least on one of the data relating to the optimized advertising campaign, the one or more sales goals and the behavioral curve or table; and generating an optimized advertising campaign of the product based at least in part on the adjusted advertisement bid value.

Implementations of the invention may include one or more of the following features. The method further comprises analyzing a keyword in the one or more reports to determine whether to promote the keyword to a single advertising campaign, maintain the keyword in the keyword table, or remove the keyword from the keyword table. The analysis of the keyword is performed based on the keyword data in connection with the keyword. The keyword data for the keyword includes at least one of a click-through rate of the keyword and the number of sales in connection with the click-through rate. In the case that the keyword is neither promoted to a single advertising campaign nor removed from the keyword table, the keyword is maintained in the keyword table until there is sufficient keyword data to perform another analysis of the keyword. In the case that the keyword is neither promoted to a single advertising campaign nor removed from the keyword table, the keyword is maintained in the keyword table while complying with any automated exclusion criteria defined by the seller. The method further comprises modifying the keyword table based on the analysis of the keyword.

In yet another embodiment, the present invention may include a method of automatically producing an advertising campaign of a product for an online marketplace seller, the method performed by an application including one or more programs of instruction embodied in a non-transitory computer readable medium and executable by a processor to configure the application, comprising: obtaining one or more prior advertising campaigns of a product generated by the seller in the online marketplace by connecting with an online marketplace account of the seller; generating at least one automated advertising campaign of the product having an online marketplace listing with an online marketplace using information from the one or more prior advertising campaigns; collecting data on one or more keywords used in relation to the at least one automated advertising campaign, the data including an initial set of daily clicks or sales on the online marketplace listing; generating a single keyword advertising campaign of the product, wherein a single keyword of the single keyword advertising campaign is selected from the one or more keywords at least in part on the basis of the initial set of daily clicks or sales on the online marketplace listing; collecting data on the single keyword used in relation to the single keyword advertising campaign, the data including a second set of daily clicks or sales on the online marketplace listing; executing a machine learning component of an adaptive machine learning platform to generate a machine learning component output, wherein the machine learning component output is generated based at least in part on the data on the single keyword used in relation to the single keyword advertising campaign; generating a behavioral curve or table relating to an advertisement bid value of the online marketplace listing and a cost per click value associated with the online marketplace listing based at least in part on the machine learning component output of the machine learning component; generating one or more sales goals of the product for the online marketplace seller on the online marketplace; generating a current advertisement bid value based at least in part on the one or more sales goals and the behavioral curve or table; generating a current advertising campaign of the product based at least in part on the optimized advertisement bid value; and generating an optimized advertisement bid value by continuously adjusting the current advertisement bid value until the current advertisement bid value has reached an optimized value, the continuous adjustment being performed by: collecting data on the optimized advertising campaign, the data including a set of sales on the online marketplace listing; generating an adjusted advertisement bid value based at least on one of the data relating to the optimized advertising campaign, the one or more sales goals and the behavioral curve or table; and generating an optimized advertising campaign of the product based at least in part on the adjusted advertisement bid value.

Implementations of the invention may include one or more of the following features. The information from the one or more prior advertising campaigns includes one or more prior keywords used in the one or more prior advertising campaigns and prior keyword data in connection with the one or more prior keywords. The prior keyword data includes a set of daily clicks or sales in the online marketplace listing in connection with the one or more prior keywords. The prior keyword data further includes one or more of a number of impressions relating to the online marketplace listing, a total number of clicks on the online marketplace listing, a click-through rate, a conversion rate, a total number of advertisement-generated sales of the product, a total number of organic sales of the product, and a total number of sales of the product through the online marketplace listing. The one or more prior keywords are included in the one or more keywords used in the at least one automated advertising campaign. The method further comprises analyzing each keyword of the one or more keywords in the automated advertising campaign to determine whether to promote the keyword to a single advertising campaign, maintain the keyword in the at least one automated advertising campaign, or remove the keyword from the at least one automated advertising campaign. When a prior keyword of the one or more keywords used in the at least one automated campaign is analyzed to determine whether to promote the prior keyword to a single keyword advertising campaign, the analysis is performed based at least in part on the prior keyword data in connection with the prior keyword.

In yet a further embodiment, the present invention may include a method of automatically producing an advertising campaign of a product for an online marketplace seller, the method performed by an application including one or more programs of instruction embodied in a non-transitory computer readable medium and executable by a processor to configure the application, comprising: obtaining information from one or more competitor products listed in the online marketplace by competitors to the seller; generating at least one automated advertising campaign of a product having an online marketplace listing with an online marketplace based on the information obtained from the one or more competitor products; collecting data on one or more keywords used in relation to the at least one automated advertising campaign, the data including an initial set of daily clicks or sales on the online marketplace listing; generating a single keyword advertising campaign of the product, wherein a single keyword of the single keyword advertising campaign is selected from the one or more keywords at least in part on the basis of the initial set of daily clicks or sales on the online marketplace listing; collecting data on the single keyword used in relation to the single keyword advertising campaign, the data including a second set of daily clicks or sales on the online marketplace listing; executing a machine learning component of an adaptive machine learning platform to generate a machine learning component output, wherein the machine learning component output is generated based at least in part on the data on the single keyword used in relation to the single keyword advertising campaign; generating a behavioral curve or table relating to an advertisement bid value of the online marketplace listing and a cost per click value associated with the online marketplace listing based at least in part on the machine learning component output of the machine learning component; generating one or more sales goals of the product for the online marketplace seller on the online marketplace; generating a current advertisement bid value based at least in part on the one or more sales goals and the behavioral curve or table; generating a current advertising campaign of the product based at least in part on the optimized advertisement bid value; and generating an optimized advertisement bid value by continuously adjusting the current advertisement bid value until the current advertisement bid value has reached an optimized value, the continuous adjustment being performed by: collecting data on the optimized advertising campaign, the data including a set of sales on the online marketplace listing; generating an adjusted advertisement bid value based at least on one of the data relating to the optimized advertising campaign, the one or more sales goals and the behavioral curve or table; and generating an optimized advertising campaign of the product based at least in part on the adjusted advertisement bid value.

Implementations of the invention may include one or more of the following features. The one or more competitor products have features or characteristics that are similar to the product. The information obtained from the one or more competitor products includes one or more competitor keywords used in one or more corresponding competitor advertising campaign and competitor keyword data in connection with the one or more competitor keywords. The competitor keyword data includes a set of number of impressions, number of daily clicks, number of sales, or volume of sales in the online marketplace listing. The method according to claim 17, wherein the one or more competitor keywords are included in the one or more keywords used in the at least one automated advertising campaign. The method further comprises determining a best-selling or highest-ranked competitor product of the one or more competitor products based on product sales information from the online marketplace; selecting one or more competitor keywords used in one or more corresponding competitor advertising campaign for the best-selling or highest-ranked competitor product; and generating an automated advertising campaign using the one or more competitor keywords.

BRIEF DESCRIPTION OF THE DRAWINGS

The aforementioned and other aspects, features and advantages can be more readily understood from the following detailed description with reference to the accompanying drawings wherein:

FIG. 5 shows the expected behavior of the number of sales for a fixed UPC when the selling price is made variable for purposes of learning the pattern modification when there is a change in price as associated with a corresponding variation in the bid value. It is important to note that in order to sell the same number of products, the bid value must change in the same direction as the sales price varies.

FIG. 6 shows a representation of the observed variation of the number of clicks necessary to obtain one order, i.e., clicks to order, of a given UPC. As the sales price of the same UPC varies, the number of clicks to get one order presents a corresponding trend.

FIG. 7 shows the observed variation of the total sales as related to the ratio of CPC/bid. As the ratio of CPC/bid approaches unity, the total number of sales decreases.

FIG. 8 shows the relation between the number of organic sales of a UPC and the variation of the actual ratio of CPC/bid for a given keyword.

FIG. 9 shows the relation between the number of sales by ads for a given keyword of a UPC and the variation of the actual ratio of CPC/bid for that keyword.

FIG. 10 shows the relation between the number of sales by ads of a UPC generated by a specific keyword and the variation of the actual CPC value for that keyword.

FIG. 11 shows the relationship between ACoS expenditure and CPC value.

FIG. 12 shows the relationship between ACoS expenditure and bid value.

FIG. 13 shows a typical relationship between CPC and bid for a given keyword of a UPC, demonstrating the three typical relations of CPC with respect to the bid—an increasing linear relation up to a CPC/bid ratio around 0.90, a near constant value for a CPC/bid ratio of less than 0.50, and a variable relation in between these.

FIG. 14 shows a typical relationship between sales volume (number of sales) and price for a given UPC.

FIGS. 15-16 show the relationship between the bid and number of units sold, and between the bid and the average unit cost of advertising to obtain the number of units sold. The illustrated curves are fundamental to the optimization process of advertising expenditure, combining a basic value that depends only on the seller, e.g., a bid, with the two main variables that are the crux of any selling campaign—the number of units sold and the unitary ad spending to achieve the sales goals.

FIG. 17 shows a typical output of a digital marketing solver (DMS) for a UPC, with two possible solutions.

FIG. 18 shows a typical output of optimization table for a particular UPC, with possible values of the bid, the expected number of expected sales, and the average cost of sale.

Figure 19:
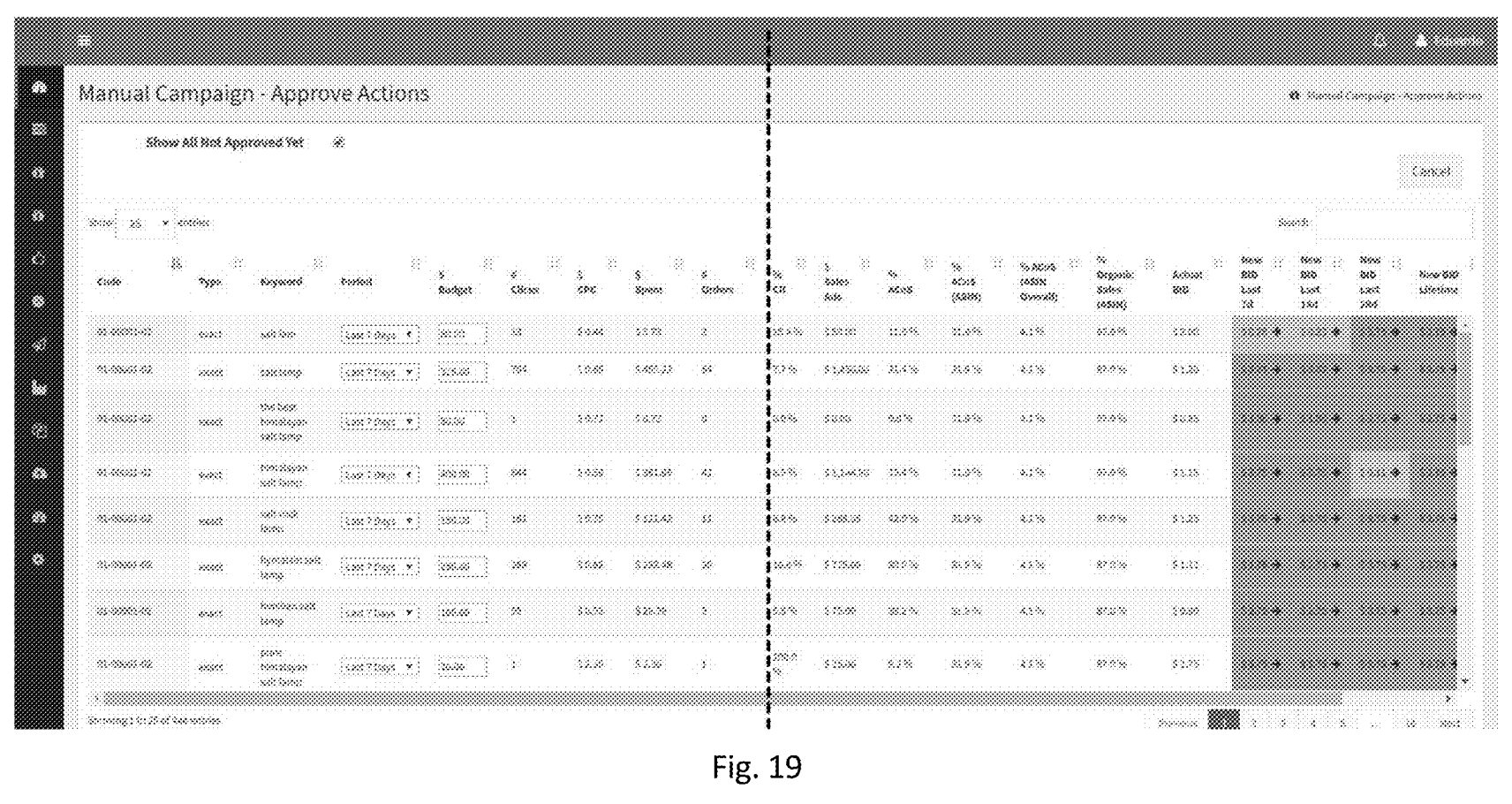

FIG. 19 shows a typical output of a DMS for a UPC, with suggestions of new bid values and capability to change the bid value according to one embodiment of the present invention.

Figures 20, 21:
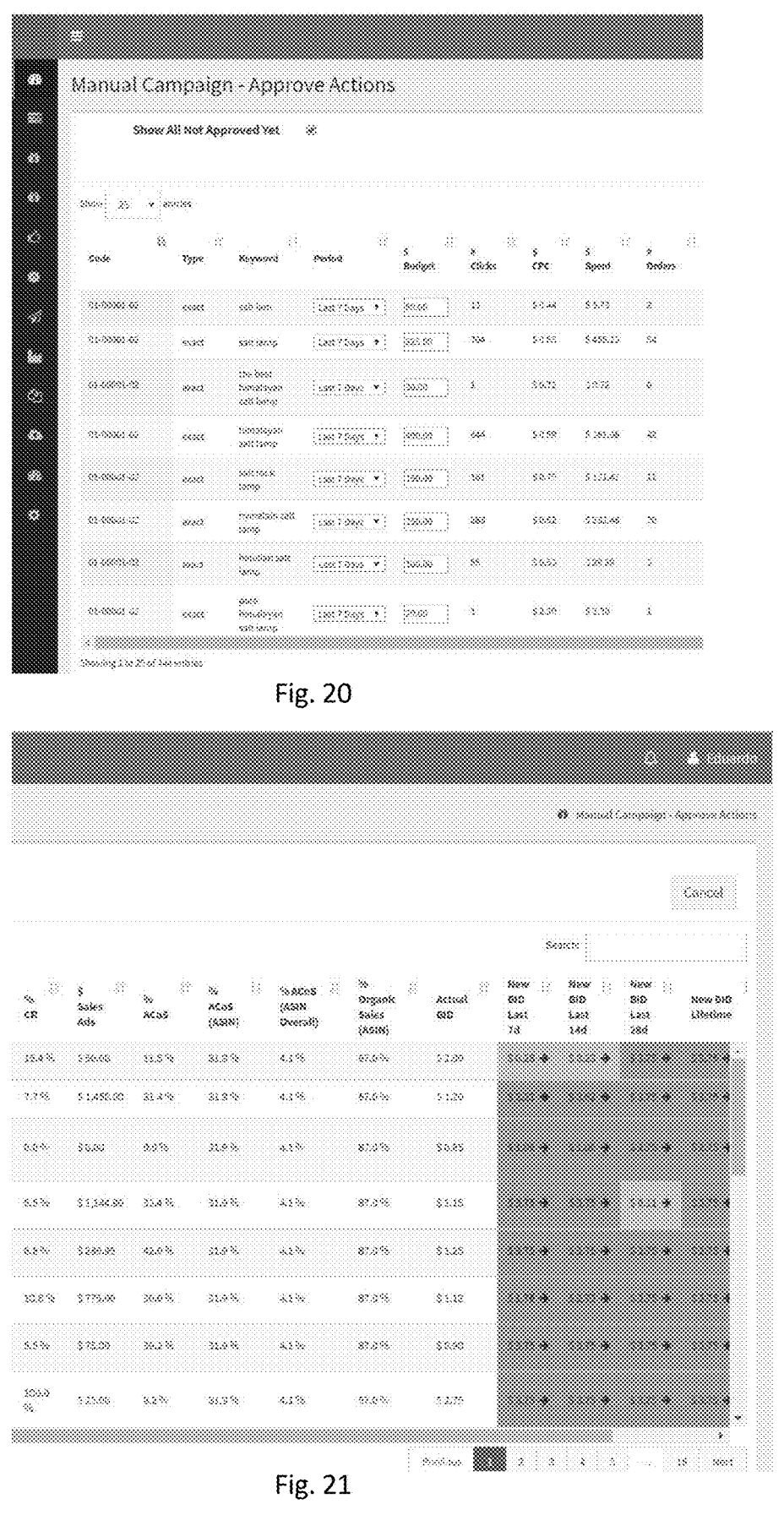

FIG. 20 shows an enlarged view of a portion of the typical output of a DMS according to one embodiment of the present invention.

FIG. 21 shows an enlarged view of a portion of the typical output of a DMS according to one embodiment of the present invention.

FIG. 27 shows an example of table illustrating a ranked list of daily values in connection with a given keyword or product.

DETAILED DESCRIPTION OF THE INVENTION

Figure 1:
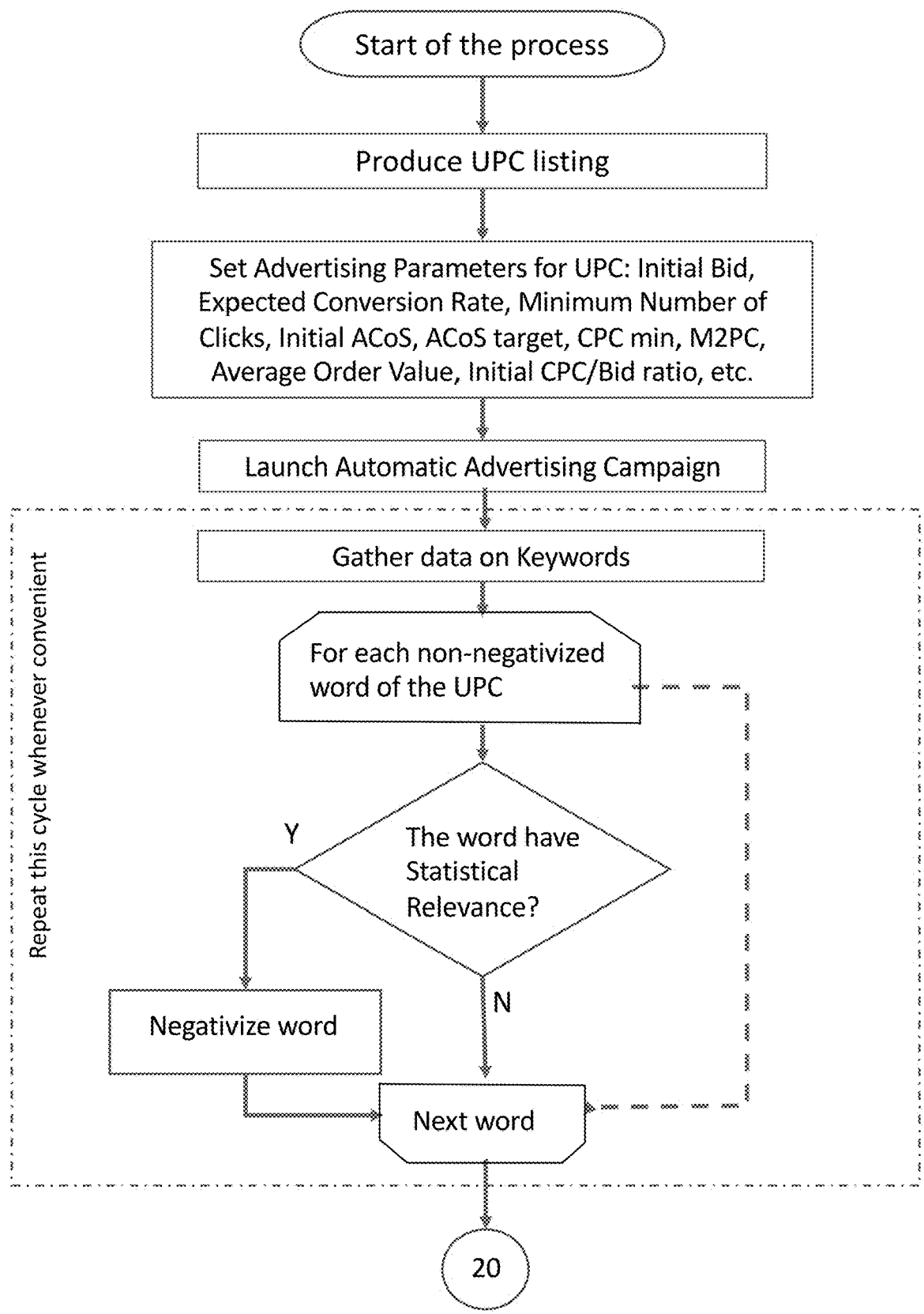
FIGS. 1-4 show a schematic flowchart of the optimization process, including the data gathering process and the operations to achieve optimization of the capital expenditure in keywords campaign for a given UPC. This optimization is made through the automatic analysis of the results of automatic campaigns and subsequent automatic launching of exact type keywords advertising campaigns.
Figure 2:
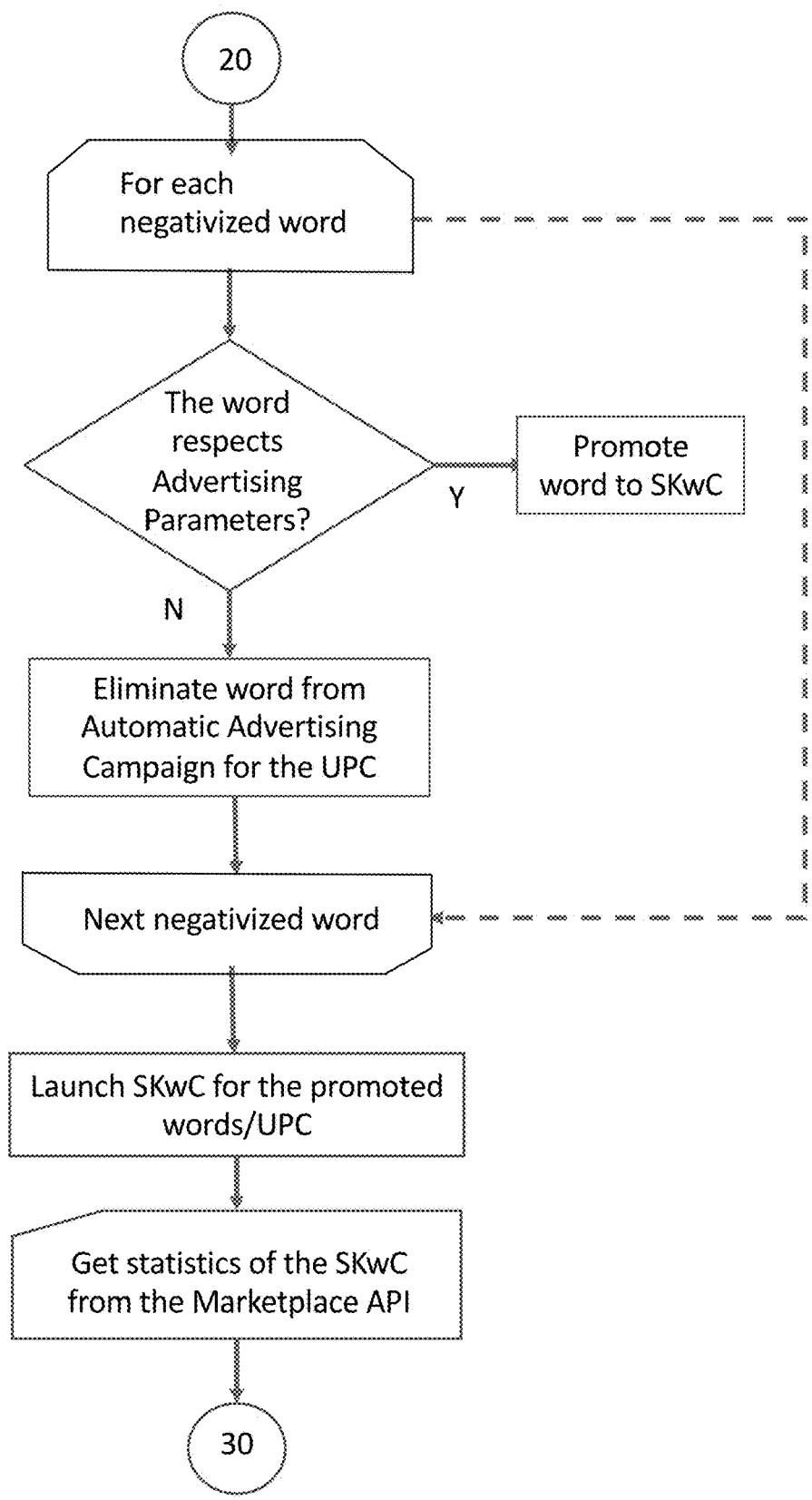
Figure 3:
Figure 4:
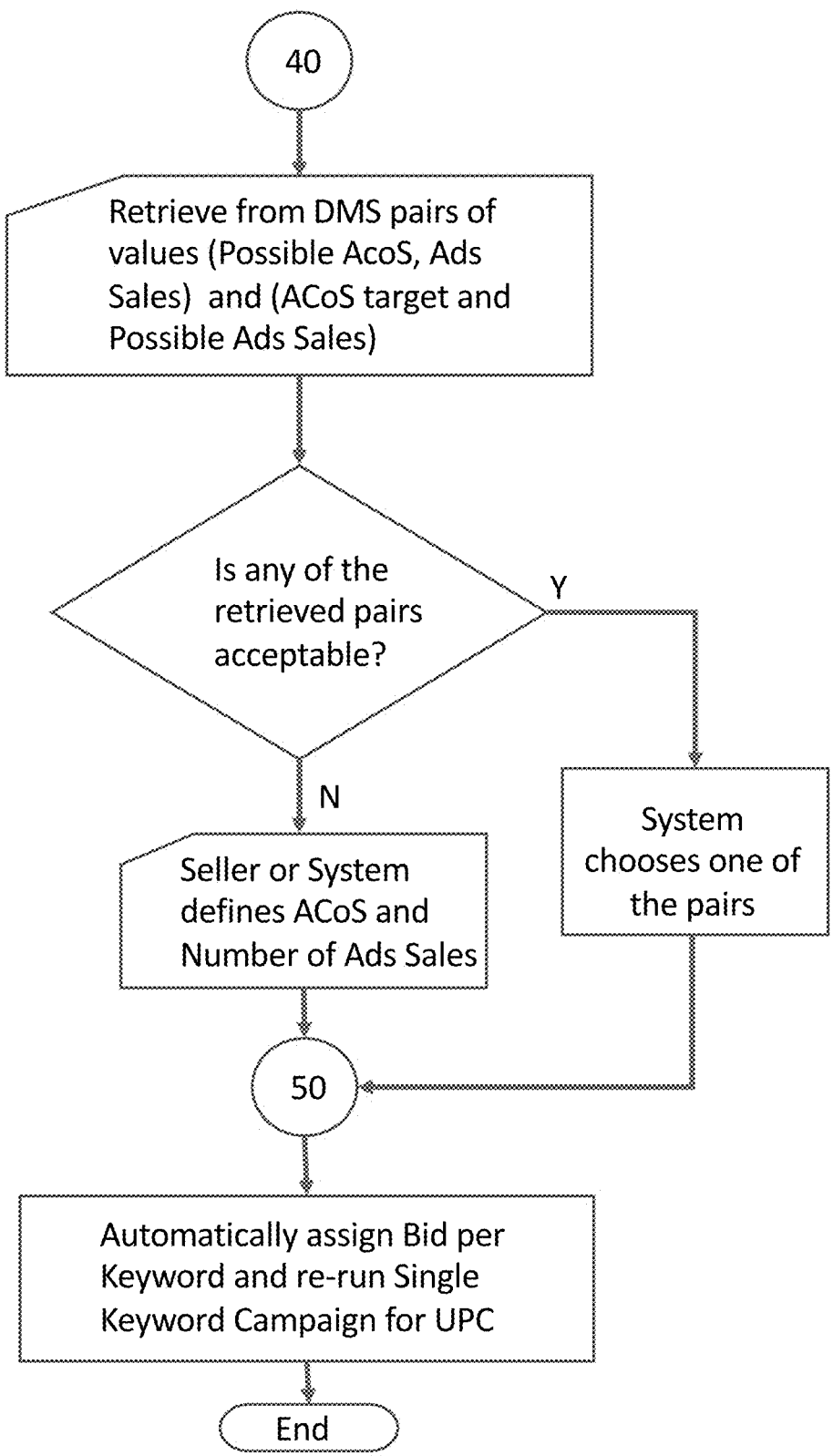

The present invention is directed to optimizing and automating the advertising expenditure in online-based commerce, i.e., e-commerce, by achieving an optimized sales volume and sales speed of a UPC with the smallest viable spending in advertising campaigns in marketplaces while respecting the actual and forecasted inventory level of that UPC. It can also be directed to optimizing and automating the advertising expenditure in online-based commerce, i.e., e-commerce, by achieving a target ACoS value with the maximum total number of sales for a UPC while respecting the actual and forecasted inventory level of that UPC.

Direct advertising in e-commerce essentially consists of bidding for relevance, e.g., appearing before competitors, on the search engine lists. This task must consider two main linked actions:

1. Choosing the most suitable words, e.g., keywords, to converge the search for the subject UPC of the advertising campaign; and
2. Achieving a fair value of CPC to meet the sales goals (value and speed) with an ACoS as small as viable, or respecting a target ACoS value (calculated either in relation to advertisement-generated sales or in relation to overall sales of the seller in the online marketplace) while achieving the corresponding maximum total number of sales of the UPC.

The choice of words referenced above is critical to the process, as advertising campaigns for new products typically start with no information on which words will capture the customers truly interested in the UPC and not in similar products or products thinly linked to the subject product.

Usually, with no information on which are the "best" words, the process starts with the launching of an automatic campaign, where a search engine suggests a wide array of words chosen by some proprietary criteria unknown to the seller.

Search engines usually charge per click, and thus their goal is to launch an automatic campaign with the broadest set of words related to the UPC, as it is unknown in advance which words will attract the attention of the customer with all clicks being charged. For instance, for the product "Pet Stairs," a click can be obtained, among others, through the words: "Pet," "Stairs," "Pet Stairs," "Dog stairs," "Stairs for pets," "pet food," "pet leashes," "wood stairs," "stairs gate," etc. Some of these words and phrases are pertinent while others are not. The retailer is charged for any click in every word during the automatic campaign, receiving information from the search engine on which word or words specifically generated the charged clicks.

The broadness of automatic campaigns can make them very expensive, so it is desirable, for the sake of efficiency, to streamline the list of words. A typical method is to start with an automatic campaign and then to select from the list of clicked words those most promising regarding sale generation.

When optimizing an advertising campaign of an existing product on the marketplace, it is preferable to narrow the automatic campaign producing a description of the UPC based on descriptions used by popular sellers of that product on the marketplace.

This invention directed to the optimization of capital allocation in advertising campaigns may include some or all of the following steps. The steps are presented herein as preferred steps according to one embodiment of the present invention.

1. Product Listing;
2. Automatic Campaign;
3. Word Screening;
4. Previous Advertising Campaigns
5. Single Keyword Campaigns;
6. Behavior Curves;
7. Analysis of Organic Sales×Ranking×Total #of Sales;
8. Bid×Organic Sales×ACoS Target;
9. Sales Goals;
10. Digital Marketing Solver; and
11. Capital Allocation.

These steps need not be present in every use of this invention, and may be grouped, merged, split, ordained, or arranged in different ways. The steps, variables, and parameters that are involved in the calculations for selling a UPC in the marketplace will be described in sequence.

Product Listing

Selling a new product starts with the product listing (naming and description) on a specific webpage or marketplace. It is preferable to research and study the public listings already used by popular sellers of the product to make this listing more attractive and appealing to potential customers. Based on this study, it is possible to produce a better adapted and more efficient listing of the product.

It is good practice to keep improving the description of the product. By establishing a routine of utilizing knowledge relating to the words acquired in the advertising campaigns, it is possible to continuously upgrade the description of the product in a positive feedback loop.

Automatic Campaign

With the listing of the product in hand (naming and description created), the next step is to launch a fully automatic campaign, where the marketplace decides to whom to show the product.

This campaign provides key information on which words were effectively used by potential customers to search for the UPC.

The search engine also provides, for each clicked word, data on the number of impressions, number of clicks (NOC), click-through rate (CTR), conversion rate (CVR), number of sales (NoS), value of sales (VaS), advertising expenditure, etc.

The main goal of this campaign is to identify which search terms were used and associated data (bid, CPC, NOC, CVR, etc.) to classify the words as either efficient or inefficient.

Each word stays on the list for as long as it has no statistical significance or relevance. As soon as there is sufficient data to assure statistical significance or relevance, the word may be expelled from the automatic campaign.

It is possible to automate the ending of an automatic campaign.

Word Screening

Once any word in the automatic campaign achieves a statistical significance or relevance, a decision must be made on such word based on the gathered data, chiefly the expected daily number of clicks. The decision is to:

1. Promote the word to a Single Keyword Campaign (SKwC);
2. Keep the word in the automatic campaign; or
3. Exclude the word from any further advertising campaign for this UPC.

A word will progress to an SKwC when the number of clicks, the conversion rate, and the ACoS forecast a selling performance that matches or exceeds performance parameters determined by the seller. In an exemplary embodiment, the system may automatically determine one or more default performance parameters or goals without any action from the seller.

If not excluded, a word will stay in the automatic campaign while complying with any automated exclusion criteria that can be arbitrarily defined by the seller. The excluded words do not receive any further automatic campaign resources. Decisions relating to prospective use of any of the words can be fully automated in the present invention.

Launching a SKwC demands a definition of the bid and the daily advertising spending, i.e., a budget, for the ads platform, which can also be fully automated in the present invention.

The expression keyword herein refers to one of three elements: a single word, an exact phrase, or an exact expression.

Once the CVR of a keyword is assumed as known, and the target ACoS is set, the bid that theoretically generates that ACoS is determined by a statistical analysis of the data provided by the marketplace for the SKwC.

After the SKwC has run for a sufficient duration (days or number of clicks, whichever generates more statistical relevancy, or any other criterion defined by the seller), an analysis is performed to determine a minimum CPC value (CPCmin) that defines whether that word is viable or not. For example, the following equation may be utilized: $CPCmin = CVRexp \times Unit\ Sales\ Price \times ACoStarget$, where CVRexp is the expected CVR for the SKwC object of the advertising campaign of the UPC, and ACoStarget is the maximum ACoS accepted for the SKwC object of the advertising campaign of the UPC (usually as only one value for all keywords relating to the product).

Based on all available data, the system automatically calculates the minimum acceptable CPC (M2PC), which, in one embodiment of the present invention, is the largest CPC from a set of the smallest 10% of CPC of all keywords. This is often approximately $0.20.

CPCmin is the CPC below which there is no interest in the keyword. It is the smallest value of CPC that makes it possible to achieve the ACoStarget in light of the expected sales price and CVRexp.

By comparing M2PC with CPCmin, an automated decision on the keyword is generated in the following manner:

If M2PC≥CPCmin, then the SKwC is abandoned or negativized; and

If M2PC<CPCmin, then the SKwC is validated.

As this word screening process does not consider the semantics or meaning of words, the process can be used in and for any language regarding the automated selection of those words to promote or negativize. In one embodiment of the present invention, the process is used to automatically select words in Japanese.

Previous Advertising Campaigns

Figure 28:
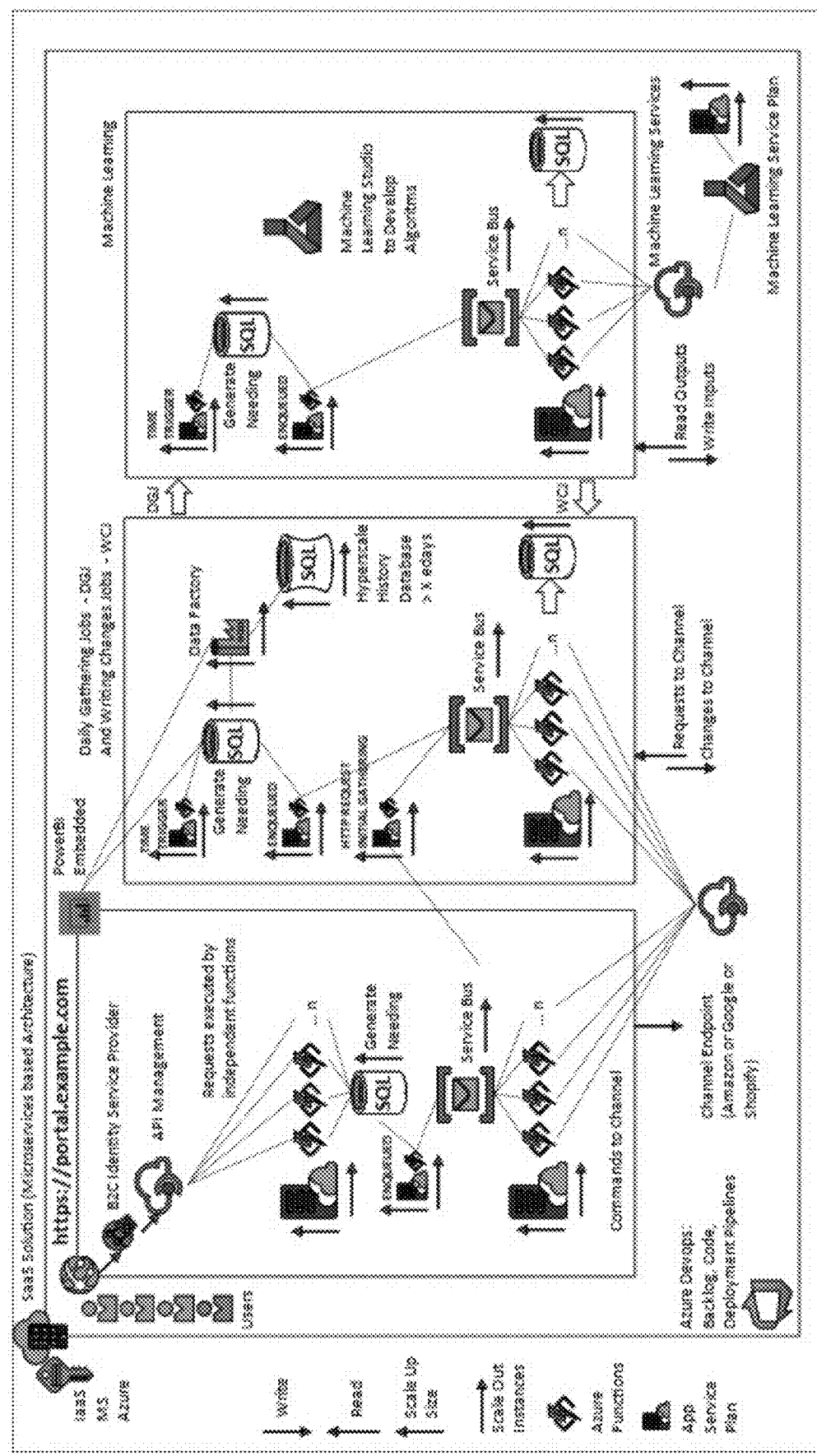
FIG. 28 shows an example of an infrastructure of the dataflow in one embodiment of the present invention, which highlights the complexity of the task of obtaining the data from the marketplace and calculating or modifying such obtained data according to a predetermined process to produce results that are inputted into, for example, one or more machine learning modules, machine learning platforms and/or machine learning components, that are configured to produce an optimal set of values that are configured to be utilized in a subsequent advertising campaign of, for example, a UPC intended to be advertised.

The system may also select to skip over generating a new advertising campaign and instead obtain information from previous advertising campaigns that involve the same product, e.g., UPC, but were not generated using the system. In other words, the user may have previous advertising campaigns that were generated using the seller's account on the online marketplace. The online marketplace may register information in connection with such advertising campaign, such as, but not limited to, keywords, a number of impressions relating to the online marketplace listing, a total number of advertisement-generated sales of the product, a total number of organic sales of the product, and a total number of sales of the product through the online marketplace listing, bid values, NoS, CTR and/or CVR. As such, the system may obtain such information regarding the previous advertising campaigns from the online marketplace by connecting with the API of the online marketplace. For example, such information can originate from the seller's account on the online marketplace, or from other marketplaces as well. An advantage of such feature is that the optimization process is greatly accelerated because the system is not required to generate a new advertising campaign from scratch, and then wait a predetermined period of time to obtain information regarding the results of the advertising campaign. The system can instead obtain the already existing trustworthy information in the previous advertising campaigns thereby preventing further unnecessary costs and saving a significant amount of time. Indeed, the time it takes to perform the word screening process is reduced as well since the system can instantly determine the words (if any) to promote to the SKwC or the words to exclude from any future advertising campaign of the product, e.g., UPC. In one exemplary embodiment, as shown in FIG. 28, while the data from the previous advertising campaigns not generated using the system may be utilized, it is also possible to utilize data from previous advertising campaigns that were generated using the system.

Single Keyword Campaigns

SKwC starts with a bid as previously described, which may respect certain arbitrary safety rules. In an embodiment of the present invention, one of these safety rules states that a maximum bid must be not greater than 7% of the sale price and $10.00.

To consider how the marketplace reacts to changes in the bid, it is preferable to have a spectrum of modifications in the variables previously mentioned as related to variations in the bid value. To avoid the inconvenience of minor variations in the automated new bid value, there may exist off-set criteria. In one embodiment of the present invention, the following criteria is used as an off-set to the new bid value:

|new bid−last bid|≥$0.03, where the seller may adjust/set this monetary value; and

|1−(new bid/last bid)|≥3.5%, where the seller may adjust/set this percentage.

The next step is to perform an analysis of behavior and interrelationships between bid, CPC, CTR, CVR, and NOC, aimed at forecasting the number of sales (NOS) and the CVR based on the value of the bid, and vice versa.

This process starts by finding the behavioral curve that the keyword and the UPC fit best. These behavioral curves are analogous to clusters that predict the relationship between bid, NOS, and average ad cost of sales (AdCS) for UPCs and keywords that have a similar performance in the marketplace (i.e., a "Look Alike" method). These clusters are defined through utilizing machine learning and artificial intelligence with respect to the seller's stored information on bids, sales, CPC, CVR, and NOC.

Important variables on these behavioral curves include the volume of searches and the level of bidding competition because less liquid products/keywords tend to have a big spread between CPC and bid, presenting discontinuities, while more liquid products/keywords behave more smoothly, adjusted to the models.

The keyword correspondence type (e.g., broad, phrase, or exact) should be respected, as CVR, volumes, and CPCs vary with the correspondence type. It is suggested, particularly in the early stages of the SKwC, to work with the exact type of correspondence and then adjust the correspondence to the other types if there is no solution respecting the ACoS target. Exact type SKwCs tend to behave better when compared to the expected behavior.

The idea may be to control the budget or total ads spending based on the bids, but there should exist a budget value ceiling as a safety net. For some words having less predictable behaviors, including those limits in less liquid situations, setting a budget can prove to be an indispensable management tool.

This invention also permits manual insertion of keywords based on private research, intuition, or determination of the seller.

The initial bid to start this SKwC can be defined by many different criteria but should incorporate the CPCmin and M2PC variables previously described. The method of the present invention herein described is typically applied to UPCs already in the market, with an existing bid that can be utilized as the initial bid.

Behavior Curves

Each keyword, as relating to a specific UPC, behaves in a certain way regarding the relationship between the bid, CPC, NOC, CVR, and AdCS. For any specific UPC and at one set price point, it is possible to define sets of different curves by plotting the relationships of NOC and bids and CVR and bids against the CPC/bid ratio.

These curves can be drawn to cluster the number of clicks and the conversion rates in any number of brackets, usually with at least three brackets. In one embodiment of the present invention, both variables are clustered in five brackets each, such as to provide 25 curves.

This relationship shows that the number of clicks and the conversion rate are the most important variables in determining the quality of a forecast for the relationship between bids, CVR, and NOS for a keyword on a specific CPC/bid relationship. The more a keyword is clicked or searched, the better the fit of the forecasts. Moreover, the higher the CVR, the more accurate the forecast.

The NOC is directly related to the ratio of CPC/bid, with an NOC for a CPC=0.75×bid being a good benchmark. In one embodiment of the present invention, the brackets for the NOC are [1, 15], [16, 45], [46, 100], [101, 300], [>300].

CVRs can be set in any number of brackets. In one embodiment of the present invention, the CVRs are set to very low, low, medium, high, and super high.

Both limits of the NOC and the CVR brackets can be freely selected by the seller at the setup of the process, according to the seller's experience or intuition. It is important to note that these curves are simply an auxiliary tool, which may or may not be used by the seller. All the values extracted from these curves can be obtained using a suitable data-crunching software, primarily when there is a sufficient volume of data on a given UPC.

These curves are also obtained through the use of machine learning software over the recorded behavior data of every keyword for each UPC. In one embodiment of the present invention, the data stored includes impressions, bids, CPC, NOC, ad spending, VOS, number of sales, ACoS, organic sales, etc. By crunching and analyzing this data, important relationships between the number of units sold and the average advertising cost of sale are established as functions of the bid alone, illustrated in FIGS. 15-16, which show the behavior of two keywords related to two different UPCs. The stored data on the advertising/selling dynamics may be used directly rather than using the referenced curves.

Figure 15:
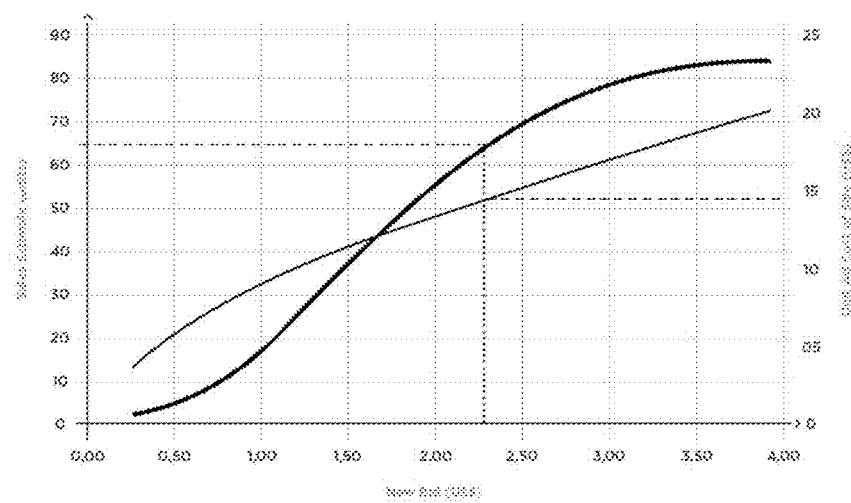
Figure 16:
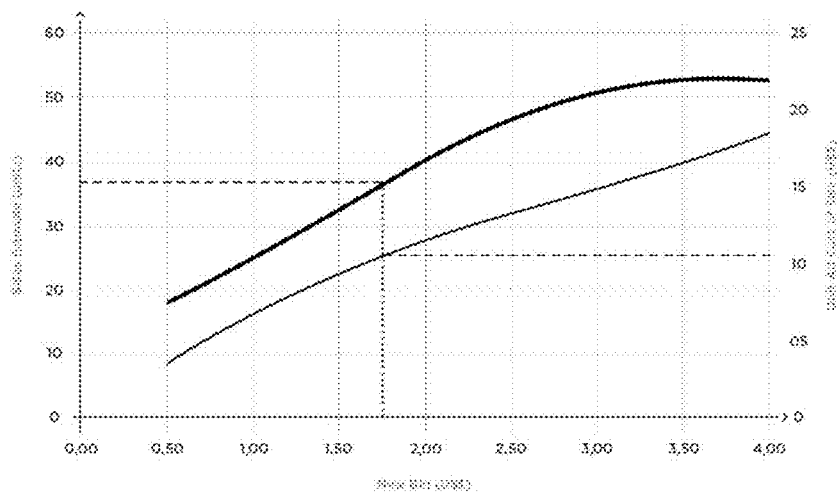
Figure 22:
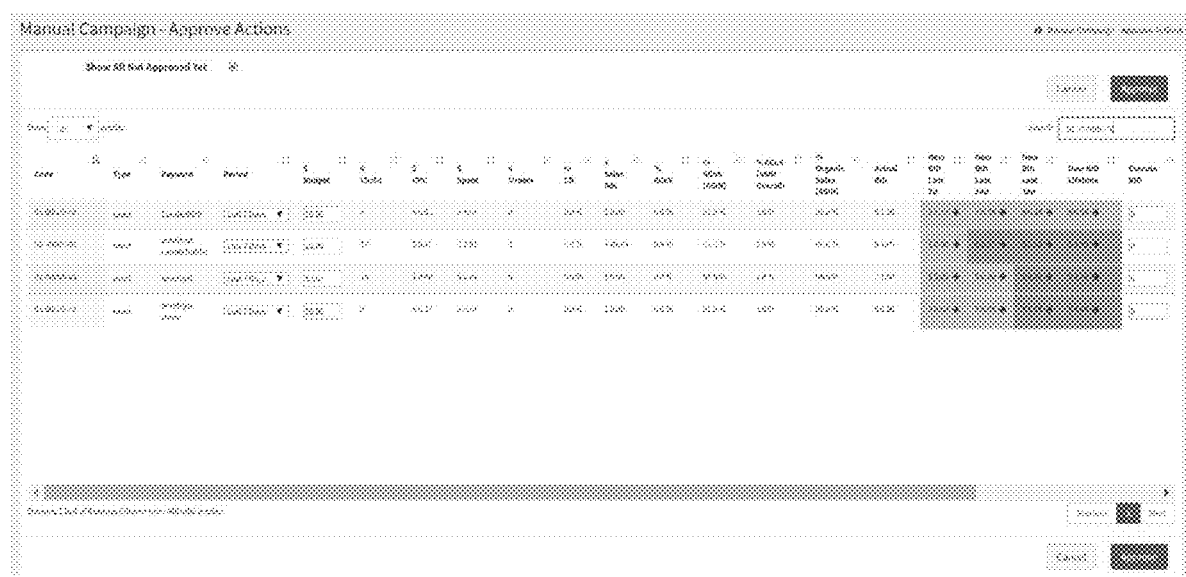
FIG. 22 shows the DMS solution for a specific UPC, an amethyst candle holder, according to one embodiment of the present invention.

FIG. 15 shows that a bid of $2.35 brings 65 daily unit sales with an average ad cost of order of $14.20. For the keyword illustrated in FIG. 16, a bid of US $1.75 produces 36 daily unit sales with an average ad cost of order of US $10.50.

There is an optimal region regarding a bid, the number of clicks, and the conversion rate obtained. Determining the most efficient combination of the bid, CVR, and NOS for each word is key for the present invention to achieve the optimal advertising expenditure solution for the portfolio.

Through continuous data collection and recording, the curves improve over time, increasing their reliability as the UPC achieves a better ranking position, more reviews, and becomes more established in each marketplace.

There are two different and opposing goals in an advertising campaign in the marketplace—the marketplace's goal and the seller's goal. The marketplace's goal is to charge the seller as much as possible through the maximum number of clicks from marketplace visitors and, if possible, charge the whole daily advertising amount defined by the seller for the advertising campaign, i.e., budgeted amount. This goal of maximum charging has no explicitly direct relationship with the conversion rate generated by clicking. On the other hand, the seller's goal is to have the maximum number of sales with the least amount of advertisement spending, respecting the forecasted inventory level, and having the paid clicks as effective as possible.

Ad spending can be segmented, assigning different spending amounts according to the hour of the day, to the day of the week, and to specific periods of the year to account for existing patterns of spending from visitors. These patterns are learned through the use of machine learning. When adopting this segmentation, the present invention can automatically vary the budget to match these patterns. This variation capability can also be used to accommodate seasonality, for instance.

The system may update its knowledge of the marketplace algorithms (MKaG), such that each time a new behavioral pattern is found, the pattern's characteristics are automatically incorporated into the system and used to define the utilized bid/budget segmentation.

The present invention allows the seller to lower the bid in incremental steps to test the MKaG, for the purpose of determining whether there is a value below which the product is either not shown or appears less as a sponsored ad.

If, for a given bid, the system detects that the MKaG does not show the product anymore, the system itself may increase the bid according to certain defined offset rules to determine the smallest bid guaranteeing a product will be shown again.

The actual process is not linear, but the system can provide tracking, with certain parameters being monitored. When the conversion rate is high, the product tends to be shown again, even with no increase in the bid or budget, as the MKaG detects a fair likelihood that a purchase will happen. Thus, there is a fair likelihood to earn the referral fee, even with a reduction in the advertising income.

Even with the system operating to lower the bid values, the ads may still appear in a good position in the marketplace. This appearance can happen when the MKaG determines that the closest competitor has a small conversion rate, with a high likelihood of limiting revenue of the marketplace only to the ads spending with little to no likelihood of earning the referral fees.

Searches for "dog bed" and "bed for dogs" can produce entirely different orders of search result appearances as a result of online marketplace algorithms' utilization of revenue produced by the seller as a "relevance factor." The number of organic sales achieved by the seller for a given UPC is one of the most relevant factors in determining the relevance of the seller in the marketplace for that UPC. Online marketplaces focus on sales, both because of expected revenue and customer experience, and accordingly prioritize presenting products with the highest likelihood of selling, including based on the key aspect of how much the product actually sold when the relevant search term was used.

This behavior is recorded and used as input to machine learning software to establish ways to increase conversion rates and decrease ACoS by creating continuously-updating optimization procedures to determine the minimum value to bid.

The system may also determine times of the day to stop or pause the campaign. This action is aimed at trying to mislead the marketplace algorithms in their goal of charging the total daily advertising budget defined by the seller.

At the end of the ad spending period, supposing that the seller's bid is very low, including zero, there is a difficult decision for the MKaG to make:

1. To promote the seller's ads to a more highlighted position with very low, possibly zero, ad income, but increasing the chances of the seller's impression being clicked and converted into a sale (therefore incurring the referral fee) in light of the good conversion rate presented by the seller; or
2. To ignore this probability and maintain the ad from the seller on a much lower position, showing the ad from another seller highlighted, even with a smaller conversion rate, thereby securing much smaller ad income. This decision lowers the likelihood of a referral fee which is greater than the ad income.

The system continues testing different bids to gather data and may use a "Look Alike" system analysis to categorize keywords in forming clusters, even with incomplete information. More specifically, the system analyzes products, categories, words, etc. on the marketplace platform 101a that can be considered as having a fair resemblance with the product. For example, a set of products may be considered to have fair resemblance with the UPC (or product) being promoted in connection with an advertising campaign, in the case that such set of products possesses features that can be associated with the product being promoted. Such features may include, but are not limited to, similar front-end words (or synonyms) or phrases, same categories and sub-categories as the UPC being advertised, products that are suggested by the search engines of the online marketplace as alternatives or complements to the UPC, etc.

The online marketplace may group the UPCs by categories to, for example, ease the task of searching for the buyers in the online marketplace. For example, a single online marketplace may group products in categories such as "Baby Products," "Kitchen, Books," and/or "Beauty & Personal Care." To further facilitate the search, each category may be further divided into subcategories. For example, within the same single online marketplace, the category "Baby Products" is subdivided into subcategories, such as, "Activity & Entertainment," "Apparel & Accessories," "Baby & Toddler Toys," etc. Searching products in the same category and/or subcategory is one example of criteria used by the system to determine look-alike products.

The group of look-alike products may be further enhanced by conducting a search in a database of the seller for other products sold by the seller that fit into the same category/subcategory. Such search may also be carried on the database of an individual, e.g., person, or organization, e.g., company, that is managing the advertising campaign. The online marketplace makes available, via API, the search terms, e.g., keywords, and/or products that produce impressions, clicks, and orders for the UPC to be advertised. Such set of keywords and/or products are examples of variables that are used by the system to calculate a daily volume index, as shown for example in FIG. 27, for the UPC being researched for the launching of the advertisement campaign. The group of "look-alike" products in connection with to the UPC being promoted is called a cluster and treated as a unit to be analyzed. The cluster may comprise all products being promoted including the data from previous advertising campaigns of the product being advertised.

Once these look-alike products are found, the attributes that they have in common with the product, e.g., UPC, and associated with the advertising campaign, such as keywords, in their advertising campaigns and front-ends, which may be images, words, and phrases that are visible to any prospective buyer that clicks on the impression of the product generated by the searching engine of the online marketplace, are analyzed to determine whether such attributes should be incorporated into the advertising campaign, as well as what else that could be considered. For example, the system may analyze products from a competitor to obtain information such as keywords in association with such products and keyword data in connection with such keywords. The keyword data may include a set of number of impressions, number of daily clicks and/or number and/or volume of sales in the online marketplace.

From such keyword data, the system may determine that one or more keywords utilized in a product by a competitor have good numbers associated therewith, e.g., daily clicks, bid values, NoS, CTR and/or CVR. As such, the system may incorporate such keywords into the advertising campaign. In an exemplary embodiment, the system may also determine the best-selling or highest-ranked product by a competitor based on the information collected using the "Look Alike" system. Then, the system selects the keywords associated with such best-selling or highest-ranked product, and generates an automated advertising campaign using such keywords or, in the alternative, an automated SKwC.

For example, the analysis of determining whether a keyword has "good numbers" associated therewith may be performed by a proprietary algorithm that associates a Daily Volume index, which is calculated based on the information retrieved from the cluster of look-alike products and/or keywords in which such cluster of look-alike products are ranked in decreasing order), as shown for the keywords "digital alarm clock," "red screen alarm clock" and "big screen alarm clock" in FIG. 27. In one exemplary embodiment of the present invention, the Daily Volume index is calculated by defining a weight of 0.85 to number of daily clicks, 0.10 to number of daily sales and 0.05 to the number of impressions. In another exemplary embodiment, only the number of clicks is considered, which results in the weight of the daily number of clicks being 1.00.

This "Look Alike" system analysis is a powerful tool, as it allows the use of information collected on different keywords as one set. This approach allows for gathering more data to be crunched, as all data on every "Look Alike" word is treated as a data on any keyword in the "Look Alike" set. This leads to a better forecast of the behavior of each word in the "Look-Alike" set, resulting in more efficient management of the advertising budget. In other words, such grouping in one dataset, which is impossible for a person to perform using pen and paper, allows data to be analyzed to identify which keywords and/or products should be considered to optimize the ad spending for the UPC being promoted.

The use of machine learning on this one huge dataset of keywords, imaging, and front-end wording produces an increase in the performance of the ad campaigns by selecting an optimal set of keywords, imaging, and front-end wording with their correspondent bid values. Indeed, the use of machine learning to select the next set of keywords, imaging, and front-end wording with their correspondent bid values optimizes the result of the campaign with respect to the desired goal, be it the decrease in as spending, an increase in the number of sales, and/or in the number of units sold, and/or an increase in the margins.

Without such feature of gathering all the information of look-alike products in one dataset, it is impossible to efficiently manage the advertising campaign in a short period of time due to the time and effort required to check the validity of the optimization choices for each set of keywords, imaging, and front-end wording with their corresponding bid values. By applying machine learning techniques to less data, the results will be less trustworthy, possibly causing delays in the achievement of sales, inventory or margin goals.

Organic Sales×Ranking×Total #of Sales

Organic sales can be defined as the difference between total sales and advertised (paid) sales, i.e., advertisement-generated sales. Organic sales do not impact on ad expenditure, which is calculated based solely on the advertised sales. In fact, organic sales lower the ACoS overall, which is obtained as the ratio between the total expenditure and the total number of sales.

It is known that the higher the ranking position and the total number of sales, the greater the organic sales. The shrinking of organic sales is usually greater than the loss of the ranking position in a non-linear way.

The system learns to predict both the ranking position of the UPC based on historical sales and the organic sales based on recorded values, such as ranking position, actual total sales values (both relative or absolute), time series, etc.

For example, if a UPC is selling 30 units a day with a ranking of #100 and the forecast is to sell 40 units a day in 20 days from now, the system knows that the ranking position will improve, for example, to a ranking of #70.

The system calculates that if this UPC was selling 30 units a day (13 advertised sales and 17 organic sales) and is forecasted to sell 40 units in 20 days, there will be an increase in organic sales of 5 units a day, from 17 daily units to 22 daily units. As the forecasted number of sales is 40 daily units, and the organic sales account for 22 daily units, the new goal for the advertisement optimizer is 18 daily unit sales. A similar analysis may be performed with respect to a decrease in the expected sales.

An innovative feature of the present invention is the utilization of organic sales as a basic factor in the intended attainment of a seller's ACoS, either the ACoStarget for the product campaign or the overall ACoStarget. The present invention newly permits placement of a target on ACoS spending for the seller, making it possible to better analyze the behavior of a company as a whole, thereby facilitating all commercial and business analyses, such as with respect to gross margin calculations.

Bid×Organic Sales×ACoS Target

In relation to the present invention, an innovative, direct, non-intuitive behavioral relationship was found between the bid, the sales price (SP), the organic sales (OS), the ACoStarget, and the conversion rate (CVR). In one embodiment of the present invention, bid and sales price are in monetary units and ACoStarget, conversion rate, and organic sales are in percentages. The expression ACoStarget encompasses both the ACoStarget for the product campaign and the overall ACoStarget.

Once the ACoStarget is known or provided, the bid to be used in the advertising campaign is expressed by the following formula: bid=SP×ACoStarget×CVR/(1−OS). This formula is balanced, as when the organic sales value increases, the bid value increases. This results in more effective advertising campaigns, which in turn increases advertisement-generated sales, as with greater bids more auctions are won. Particularly, as more auctions are won, greater relevance is generated, leading to a rising number of clicks and consequently an increase in advertisement-generated sales. The increase in advertisement-generated sales leads to a decrease in organic sales, with organic sales being the difference between total sales and advertisement-generated sales, which decreases the bid value. Relatedly, a smaller bid decreases advertisement-generated sales, which then increases organic sales. This bid value formula has not been shown in any other process or method for managing advertising campaigns that utilize organic sales in the bid calculation.

The system has been shown to tend to an equilibrium point making possible to achieve a desired ACoStarget, either for the product campaign or overall. This oscillatory process presents great comparability to a dampening process, quickly converging the bid values to a substantially fixed value.

Figure 23:
FIG. 23 shows a graphical representation illustrating variation of sales volume and overall ACoS for an exemplary entity, as well as a self-balancing aspect of the present invention in which a dampening effect may be observed.

FIG. 23 shows the relationship between sales volume and overall ACoS for an example company. On the left side of FIG. 23, there are values for certain aspects determined over a 59-day period, these aspects including volume of sales, advertising spending, and organic sales, both in terms of money units and as a percentage. The previously-described self-balancing behavior may be observed in the graph on the right side of FIG. 23, particularly showing that when the ACoS increases, the sales volume decreases, and vice versa.

The calculated bid is considered a primary bid, as it can be affected by certain normalizing factors, to account for seasonality (in the day, week, month, and year), placement, maximum bid value accepted, etc. As the statistical relevance of the number of sales increases, the value of the maximum acceptable bid also increases, based on a greater certainty relating to organic sales. In one embodiment of the present invention, when the number of sales in the last 7 days is equal to or greater than 30, the maximum acceptable bid can increase up to 35% of the sales price.

As previously stated, the process of the present invention may be entirely automated, with no need for any human selections or decisions.

Sales Goals

There should be a formal definition of the sales goals, e.g., volumes, speed, etc. The sales goals will beacon the optimization process, taking into account the inventory's actual and forecasted levels.

In the basic scenario, the main input to be considered is an automated forecast generated by any acceptable methodology. The formal sales goals can be set constant, aimed at selling exactly what is presently sold or aimed at a defined sales growth (positive or negative).

Imposed restrictions on the sales goal creates the stability demand of the sales/purchases process. These artificially-imposed restrictions bring the necessary boundary conditions and planning capabilities to stabilize the sales goals.

The sales goals should be clearly stated as a composition of organic sales and advertised sales, where the sum of these two values is the total sales.

Digital Marketing Solver (DMS)

A Digital Marketing Solver (DMS) is a process that automatically defines the optimum bid values to be used to reach the sales goals—the number of sales, the maximum ACoS, or a combination thereof. DMS may require the following inputs:

1. The desired value of sales (Xdes) based on ads, sales forecasts and inventory information as major inputs;
2. The maximum acceptable value of ACoS, which can vary over time; and
3. The complete information of the behavior curves.

It is to be noted that DMS seeks a low ACoS that guarantees the Xdes, respecting a confidence level. Based on Xdes, DMS simulates the possible scenarios, i.e., every possible bid in every keyword for that UPC, and chooses the one scenario, i.e., one defined bid value for every keyword, leading to Xdes with the lowest ACoS, thus optimizing the advertising expenditure. These decisions can also be automated to follow rules set by the seller at the setup of the process.

For example, if Xdes is 20 units, maximum ACoS is set at 27%, and DMS finds a solution that generates sales of 20 units with an ACoS≤27%, DMS will implement the solution. If DMS is not able to find a solution respecting both boundary conditions (Xdes and maximum ACoS), DMS will return two pairs of values—one respecting the maximum ACoS with the corresponding achievable total number of sales, and the other respecting the number of sales with the corresponding ACoS, as illustrated in FIG. 17. The seller may then choose from these two solutions.

The retailer may also choose something in-between, such as an ACoS of 30% and 18 unit sales. The purpose is to guarantee that the seller always understands the impact on organic sales resulting from his or her selections. As previously discussed, the system presents automatization capabilities of this decision based on parameters set by the seller.

DMS is a versatile tool, allowing for simulations and making it possible for the user to test different scenarios in understanding the impact of the decisions on organic and total sales.

DMS may also be used as a simulator to forecast the number of total sales in new or ramping UPCs. In one embodiment of the present invention, an automatic campaign runs for 21 days. Based on the data collected during this 21-day period, DMS informs the seller what could be the maximum sales goals using the set budget and what should be the budget to achieve other sales goals. This is an important feature for the DMS, making it a valuable planning tool for launching or improving products in the marketplace.

When the system runs all curves of ACoS and NOS, there may be rules established by the user that determine and produce points of interest, with different relations for number of units sold and ACoS. These points of interest are pairs of values of NOS and ACoS that do not obey either of the initially imposed constraints (Xdes and maximum ACoS) but present interesting solutions worthy of consideration in light of actual inventory levels and capital availability. For example, in a situation where Xdes is asking for 17 units and a maximum ACoS of 24% and DMS finds a solution with a sale of 15 units and an ACoS of 18%, meaning that a 25% reduction in the ACoS will only result in an 11.8% reduction in the number of sales, DMS may bring this information to the user's attention and/or ask for an answer. This decision can also be automated through adopting parameters accounting, e.g., for the impact on organic sales.

Given a keyword related to a UPC, the output from DMS may be a table or a curve, with the expected ACoS and the forecasted NOS of the UPC for every bid for that particular keyword.

The optimum solution may result in some keywords having a bid of zero. A long-tail strategy can be implemented for keywords that would have a low value bid, e.g., a bid of $0.30 in 28 keywords expected to generate 0.37 clicks per day per word with a good conversion rate. This situation presents the classic long-tail strategy that is only feasible with automated systems. A small or very large portion of the sales may rely on this strategy, usually generating an extremely low ACoS and consequently improved gross margins.

Depending on the commercial strategy of the seller, it is also possible to automatically eliminate keywords with small numbers of sales in order to concentrate attention and resources on only those keywords with high returns.

Allocating more ad spending to the keywords that generate the most sales does not guarantee more sales. The system learns which are the economical limits of number of sales of each keyword such that increasing the ad expenditure over that limit simply increases the ACoS without any expectation of increasing the number of sales accordingly.

In the example described in FIG. 18, to achieve a goal of 8 advertised sales with a maximum ACoS of 28%, the bid should be $1.00 on Keyword1 and $0.70 on Keyword2. This bidding should be the most economically efficient way of obtaining the 8 advertised sales. These bid values lead to an ACoS of 18.60%, with an ad spending of $37.20, or 0.186× $25.00×8. The average cost of sale will be $4.65 per unit, or $37.20/8. If 30 advertised sales per day is desired, it is recommended to bid $1.50 on Keyword1 and $1.25 on Keyword2, increasing the ACoS to 25.80%, with an ad spending of $193.50, or 0.258×$25.00×30. The average cost of sale will be $6.45 per unit, or $193.50/30. This average cost of sale for selling 30 units is 38.7% greater than the previous average cost of sale when the seller volume is only 8 units. If the seller is overstocked, it could be advantageous to spend more than 38.71% per sale to solve the inventory problem.

Alternatively, if desired, one can use the concept of average cost of order instead of the average cost of sale, as the ad spending is calculated per click and not per order, and one order can produce a sale of more than one unit.

Obviously, the relative profitability and return on investment (ROI) relating to a daily sales speed of 30 units will differ from that relating to a daily sales speed of 8 units.

Figure 5:
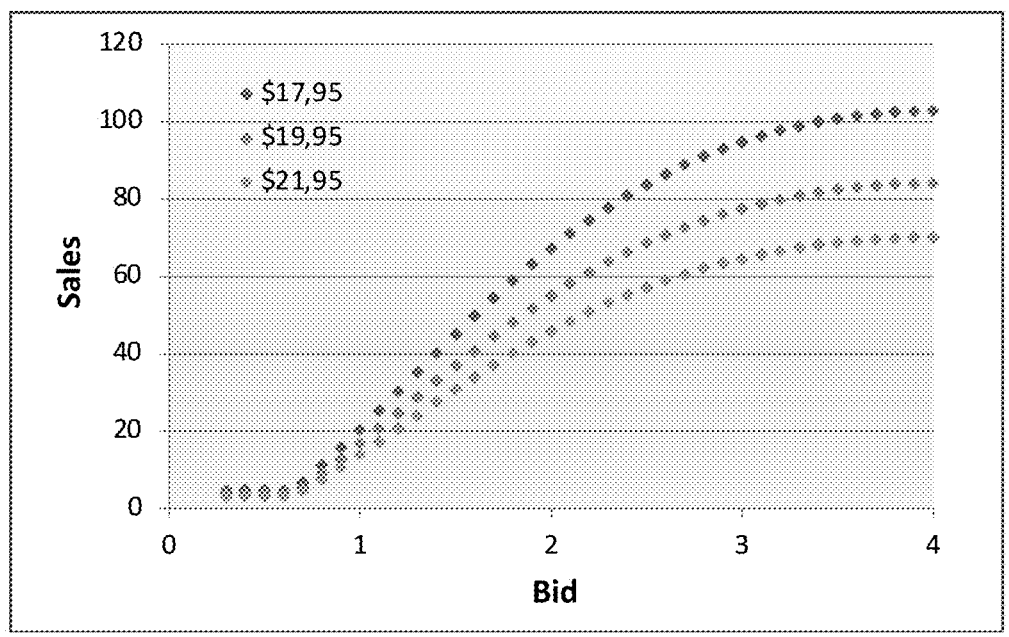
FIGS. 5-16 include data from registers of selling and advertising operations, related to several UPCs, in marketplaces. Unless otherwise mentioned, these figures refer to the behavior of either one UPC or one word for a given UPC.
Figure 6:
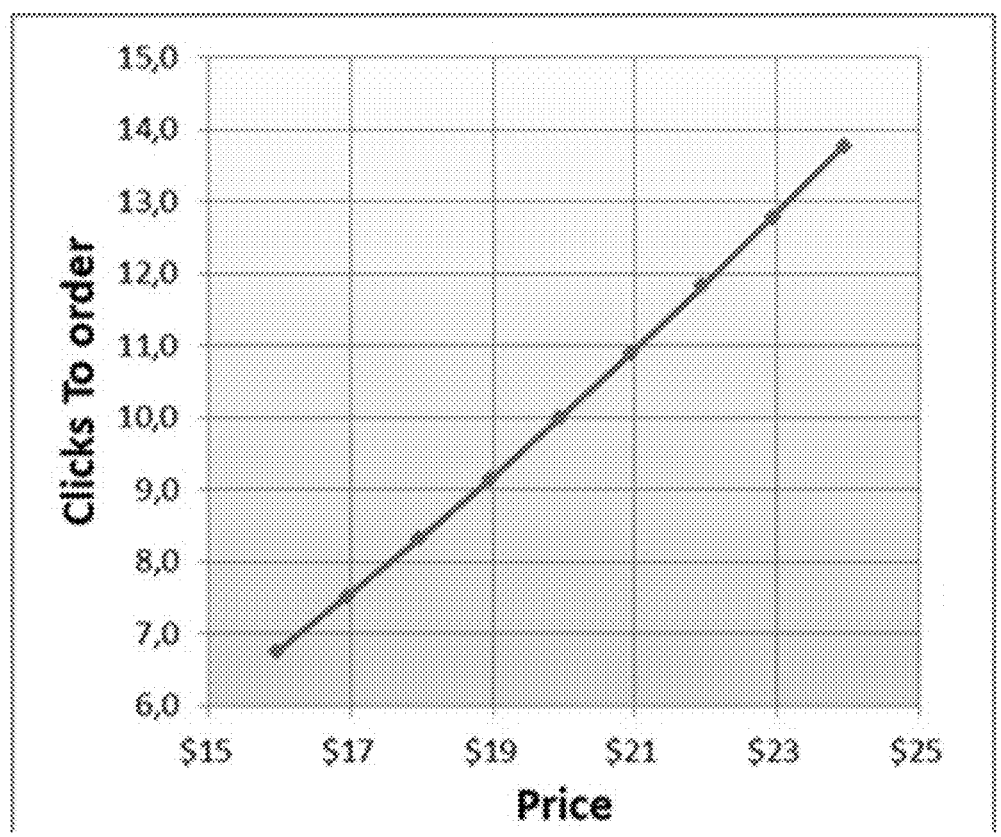
Figure 7:
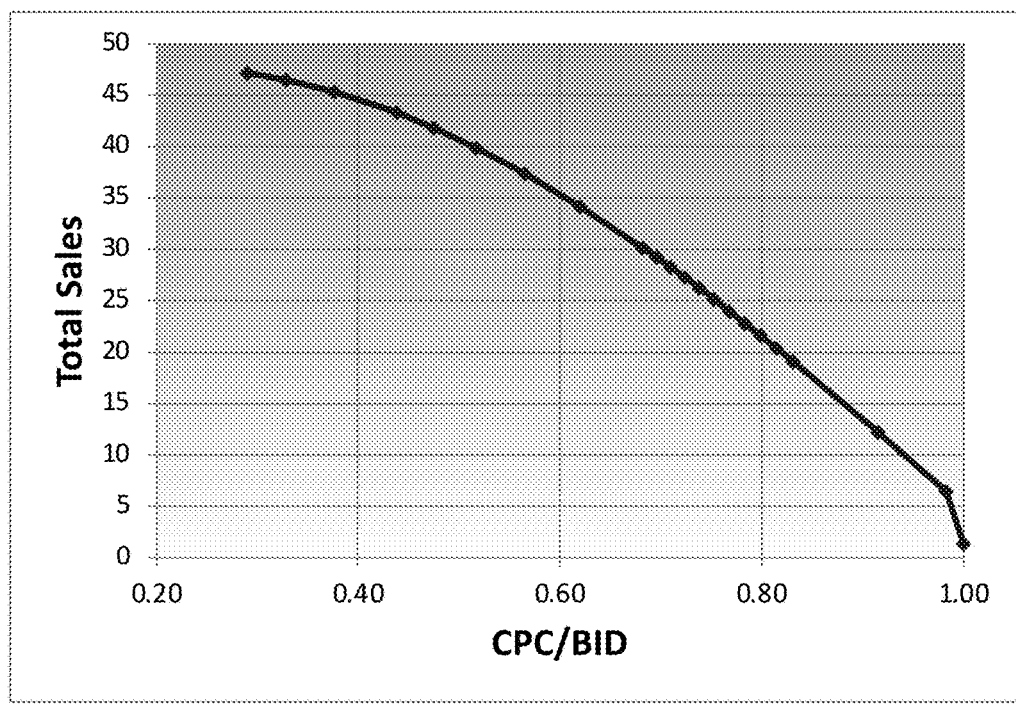
Figure 8:
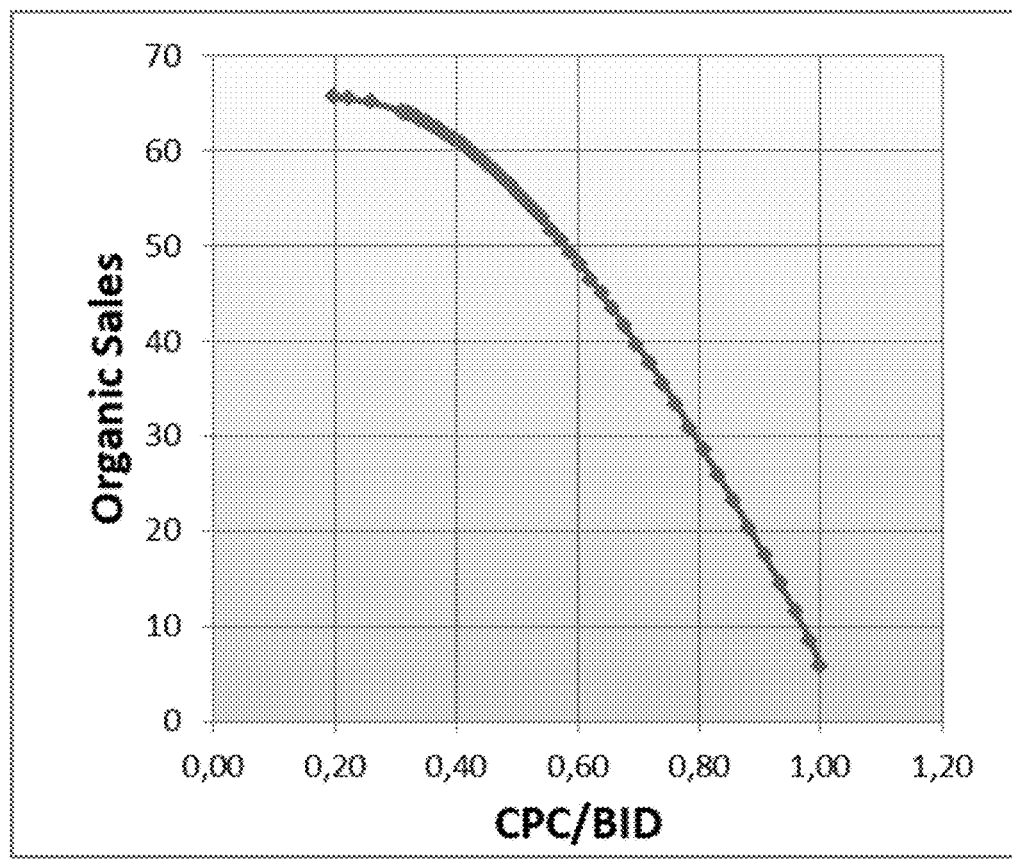
Figure 9:
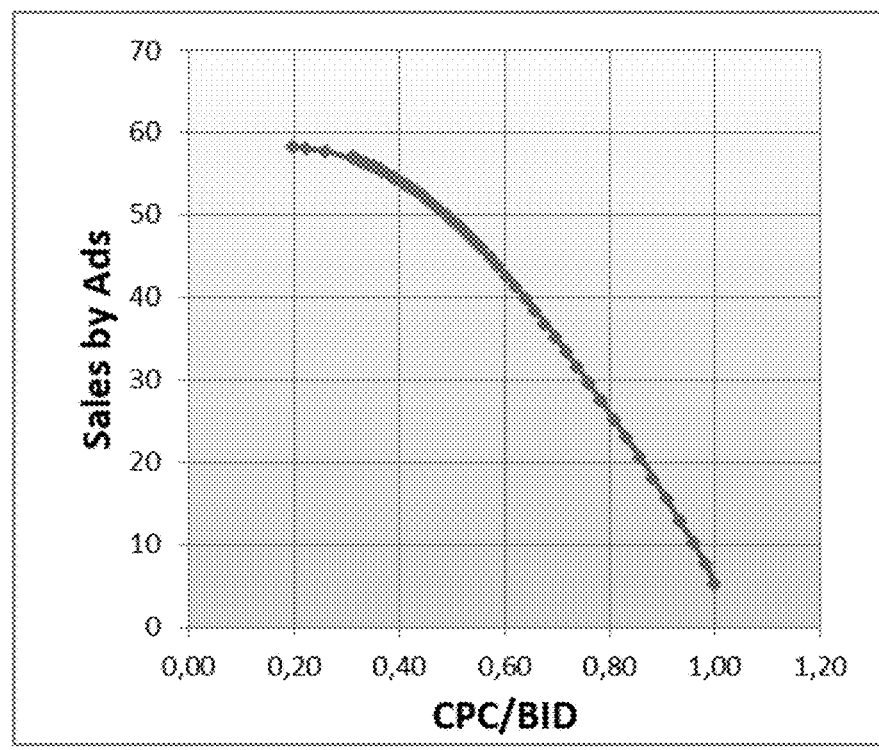
Figure 10:
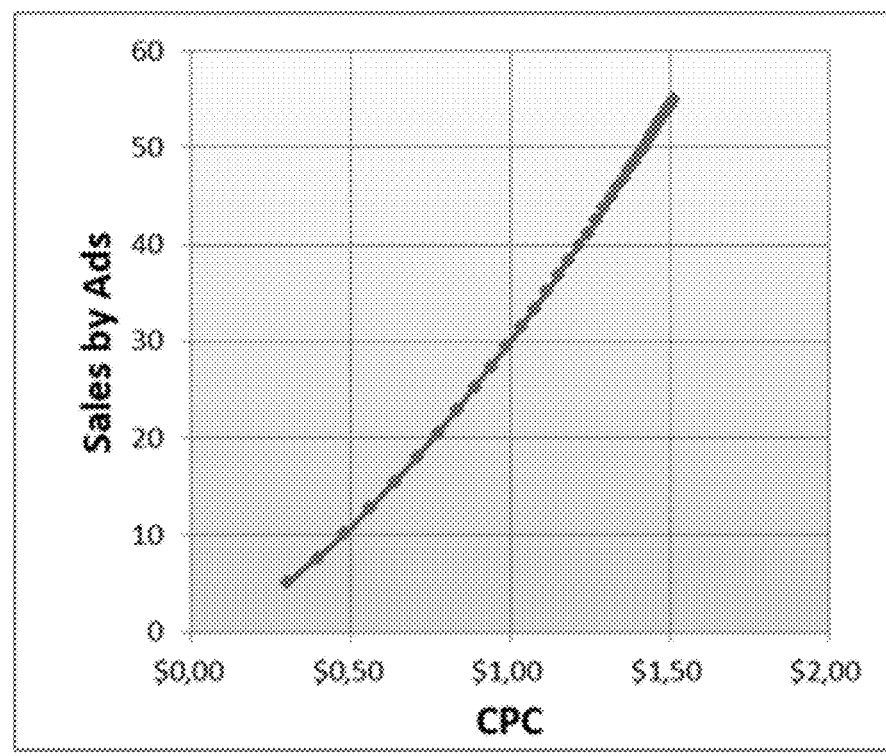
Figure 11:
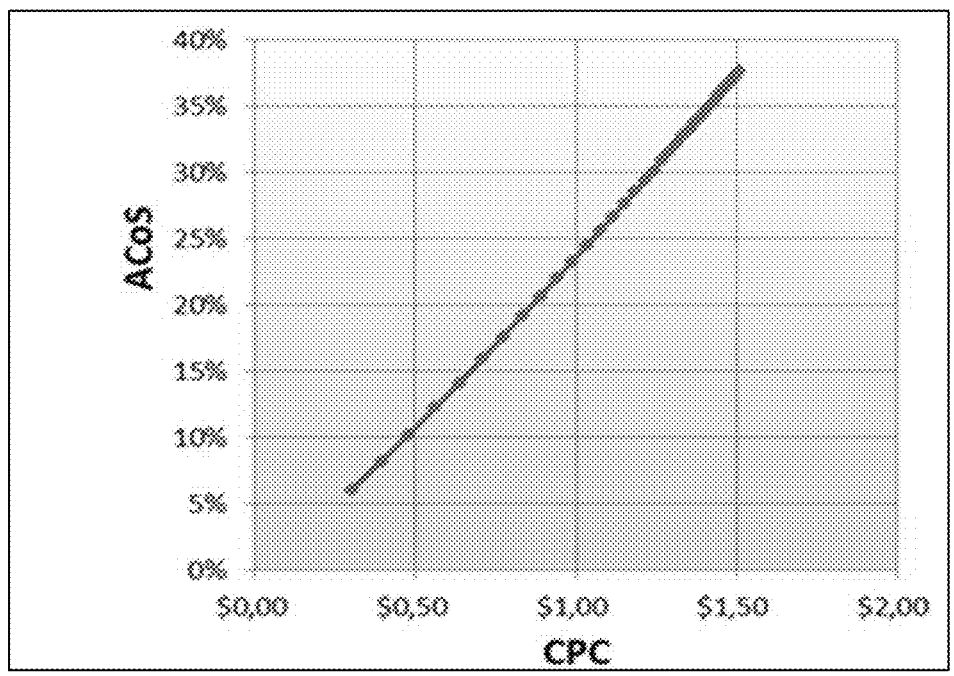
Figure 12:
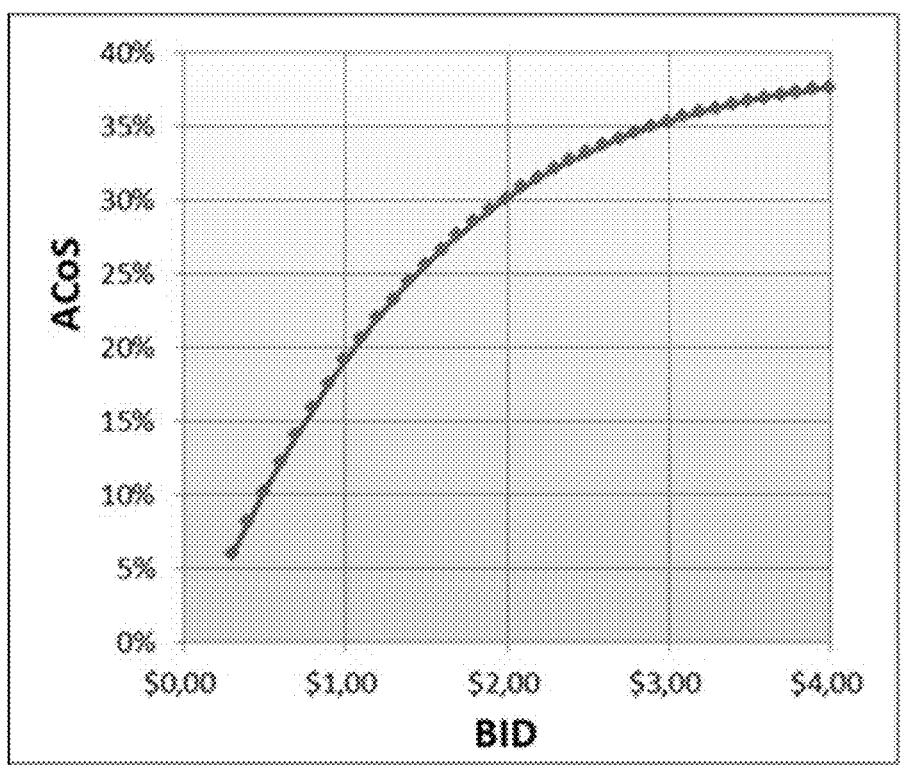
Figure 13:
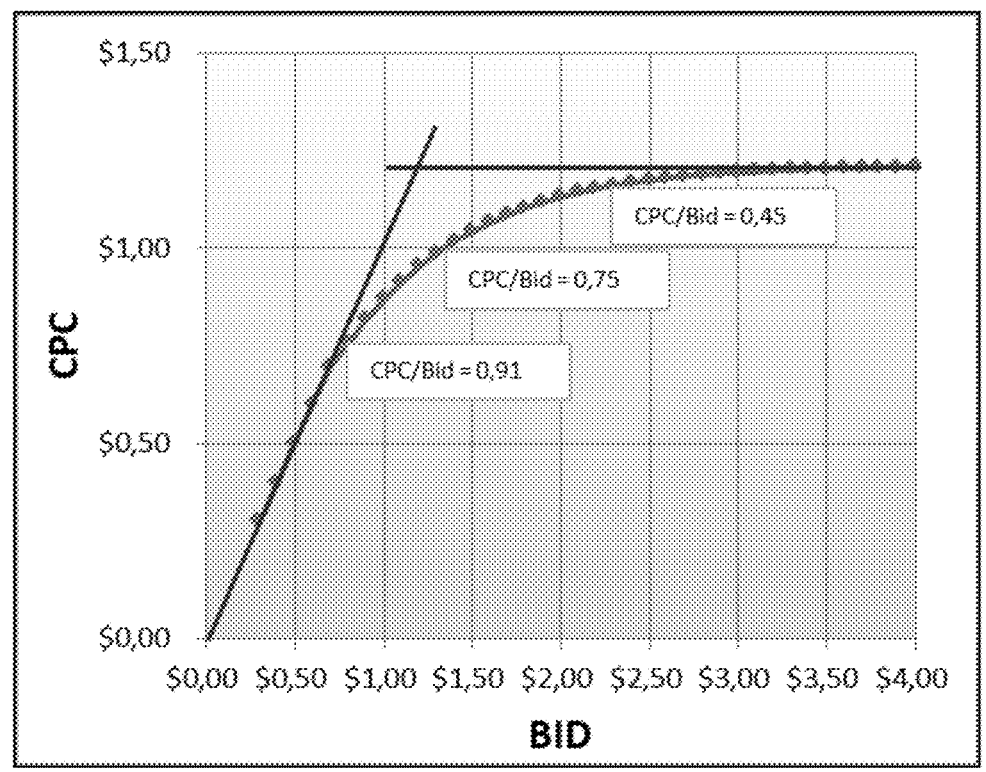
Figure 14:
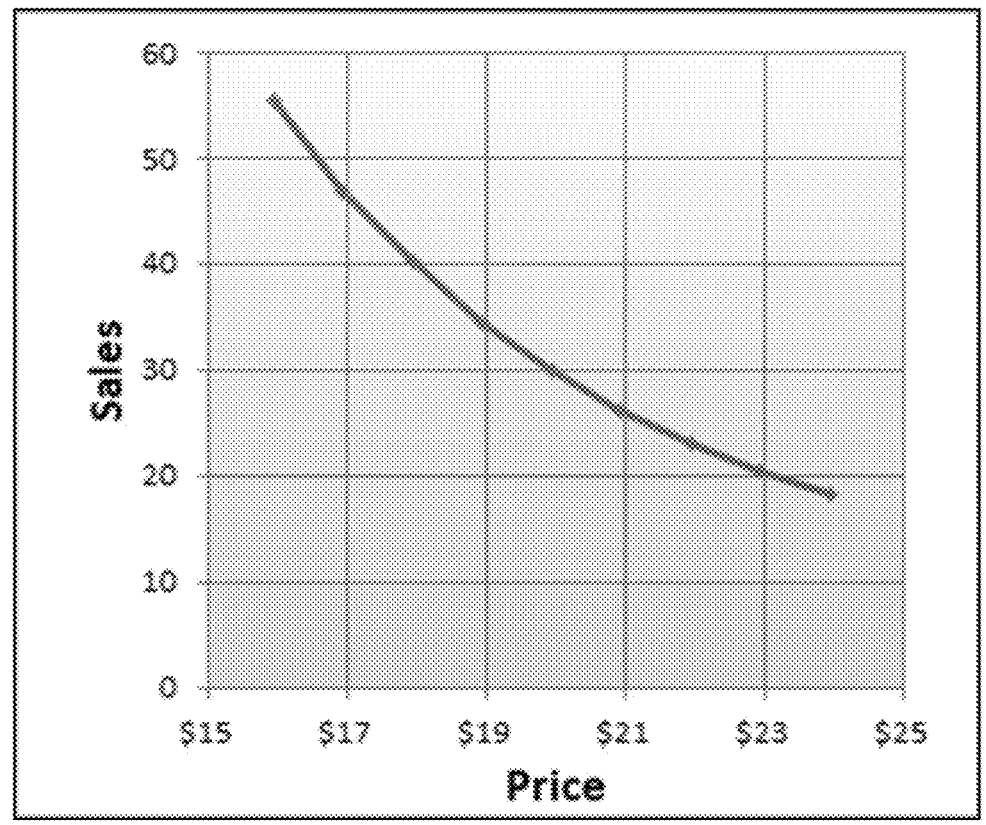

DMS can also handle price elasticity considerations, as it is simple to modify and simulate different sales prices for the same UPC to understand the behavior and mutual influences of the variables, e.g., bid, number of total Sales, number of ad sales, ACoS, etc. This kind of information is valuable with respect to defining the desired ROIs, margins, and inventory levels. FIGS. 5, 6, and 14 each show aspects related to sales price elasticity.

Capital Allocation

The capital allocation may be decided by choosing which words to bid on and the value of each bid. It is possible to prioritize products to be sold in the portfolio based on either gross margin or ROI. Sales of products can be accelerated with a better margin/ROI or decelerated with lower levels of margin and ROI. These numbers can be adjusted by reducing or increasing the ACoS, which produces a more efficient allocation of capital.

There may be safety controls in place that would reduce ads spending and sales speed to account for inventory level constraints when there is no available capital or time for new purchases to arrive in the warehouses.

By decreasing the ACoS, not only is there a decrease in the capital allocated in inventory but also an increase in margins and ROI, improving the cash flow accordingly.

Variation of Bids

The system is continuously gathering data on the variation of the conversion rates (CVR), bid, number of clicks, total sales, advertisement-generated sales, organic sales, and ACoS. The associated data processing enables the system to automatically decide on variation of the bid values with any desired time interval in order to optimize the ACoS or the sales goals.

The automated process of defining the bids described above can be further improved to allow for an automatic variation of the bid value according to the month of the year, the week of the month, the day of the week, the hour of the day, etc. If the online marketplace has a placement policy, i.e., top of search, end of search, etc., the system adjusts the bid values to consider this new set of boundary conditions.

Product Targeting

The present invention can also be used to analyze and optimize product targeting for sale of the UPC using the same process used for discovering those keywords that generated positive results. The same technique can be applied to automatically determine those other products for which comparison is beneficial. Once these other products are identified, the present invention may automatically create product target campaigns using these identified products as targets for the advertising campaigns.

The identification of these target products follows the same method as the keyword identification process, but with one key initial difference: The word screening is performed by analyzing data obtained from the list of words generated by the automatic campaign, and the product targeting is performed by analyzing data relating to the list of comparable products made available by the online marketplace. Other than this difference, the reasoning behind the process is the same. Through the relevant data processing, such as with the goal of understanding conversion rate behavior, those patterns of categories to target or avoid may be determined, specifically in an automated way with no need for human intervention.

Figure 24:
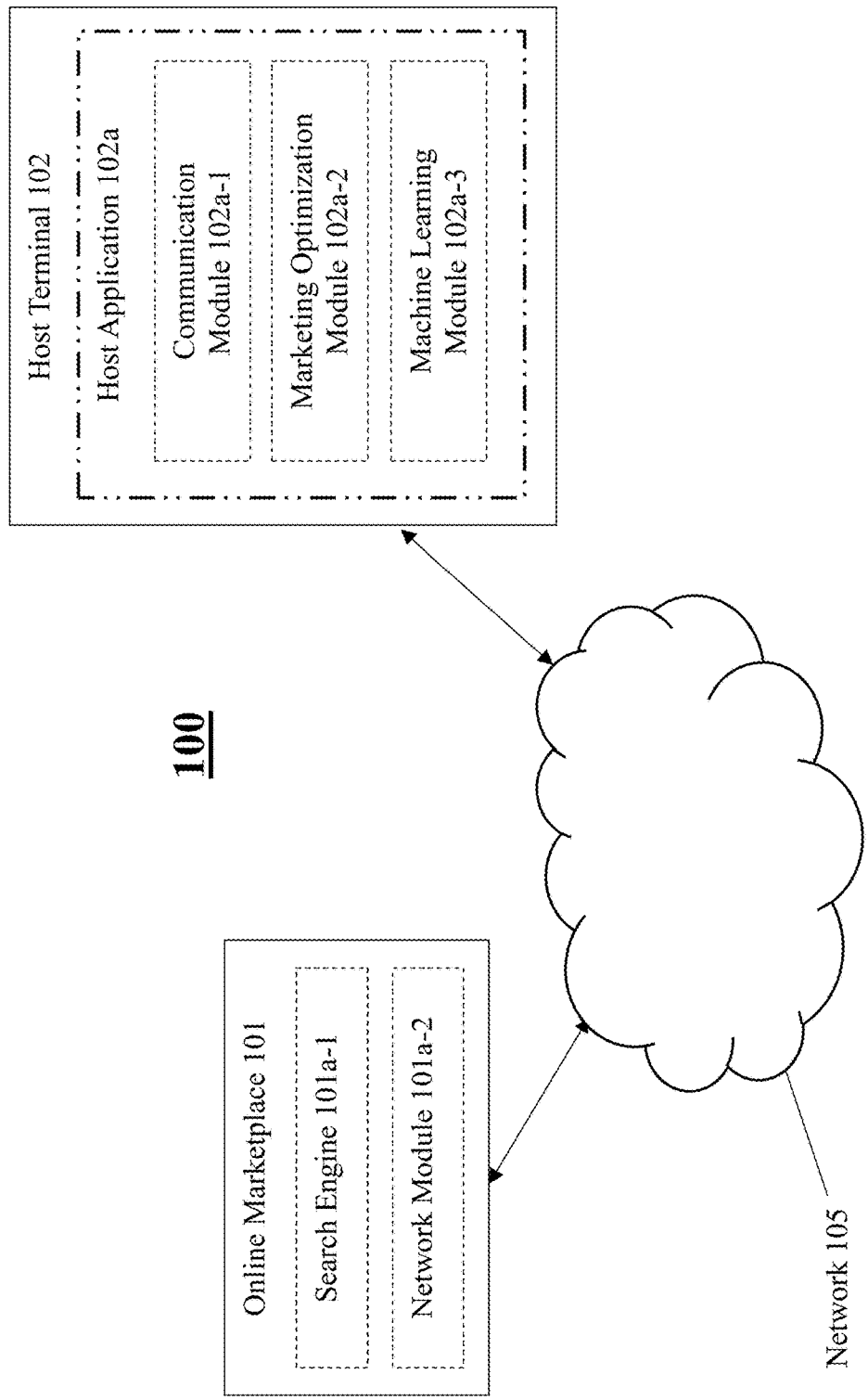
FIG. 24 shows a block diagram of a system for optimizing advertising campaigns, according to an embodiment of the present application.

FIG. 24 shows schematically a system 100 that includes a marketplace system 101 and a host terminal 102, both of which are interconnected by network 105.

The online marketplace 101 can be one or more of any computing device, including but not limited to a desktop, tablet or notebook computer, a server, a PDA (personal digital assistant), a mobile phone or hand-set, another mobile information terminal, that can communicate with other devices through the network 105. The online marketplace 101 includes all of the features identified in previous descriptions of the online marketplace. In addition, the online marketplace 101 may include a multiple of or a series of any of the aforementioned devices. The online marketplace 101 includes a search engine 101a-1 and a network module 101a-2.

The search engine 101a-1 includes all of the features identified in previous descriptions of the search engine, which includes launching an automated campaign according to the instructions by a seller, e.g., user of the host terminal 102. Because the search engine 101a-1 charges per click, the goal of the search engine 101a-1 is to launch an automatic campaign with the broadest set of words related to the UPC, as the search engine 101a-1 does not know in advance which word will attract the attention of the customer. In an exemplary embodiment, the search engine 101a-1 suggests a wide array of words chosen by some proprietary criteria unknown to the seller. Some of these words and phrases are pertinent while others are not. For instance, for the UPC "Pet Stairs," a click can be obtained, among others, through the words "Pet," "Stairs," "Pet Stairs," "Dog stairs," "Cat stairs," "Stairs for pets," etc. The retailer is charged for any click in every word during the automatic campaign, receiving information from the search engine 101a-1 on which word or words specifically generated the charged clicks. The search engine 101a-1 also provides, for each clicked word, data on the number of impressions, NOC, CTR, CVR, NoS, VaS, advertising expenditure, etc.

The network module 101a-2 permits the online marketplace 101 to communicate, via the network 105, including Ethernet, a Wi-Fi network and/or a mobile network, with another host terminal. The network module 101a-2 also allows the online marketplace 101 to communicate with the host terminal 102. For example, the network module 101a-2 may receive requests to access from users of the host terminal 102 to access the features of the online marketplace 101.

The host terminal 102 can be any computing device, including but not limited to a desktop, tablet or notebook computer, a PDA (personal digital assistant), a mobile phone or hand-set, another mobile information terminal, that can communicate with other devices through the network 105. The host terminal 102 may include a host application 102a thereon. The host application 102a includes a communication module 102a-1, a marketing optimization module 102a-2, and a machine learning module 102a-3. The host application 102a includes all and is capable of performing any of the features previously identified in connection with the descriptions of the system and/or proposed tool and one or more of the steps identified in the processes illustrated in FIGS. 1-4.

The communication module 102a-1 is capable of accessing the online marketplace 101. To facilitate such access, the communication module 102a-1 may have the capability to or be configured to interact with the API of the network module 101a-3 of the online marketplace 101. As such, the communication module 102a-1 can obtain information from the online marketplace 101 or instruct the online marketplace 101 to generate an automated advertising campaign by communicating with the network module 101a-3. In addition, the communication module 102a-1 may allow the marketing optimization module 102a-2 to access to or receive, in real time, API data that may be reports in the form of, for example, a table, by communicating with the network module 101a-3 (as described previously). Moreover, the communication module 102a-1 may also allow the marketing optimization module 102a-2 to access the seller's account on the online marketplace to obtain information regarding previous advertising campaigns by communicating with the network module 101a-3 (as described previously).

The marketing optimization module 102a-2 allows the user of the host terminal 101, e.g., the seller, to generate an advertising campaign by instructing the search engine 101a of the online marketplace to generate an automated advertising campaign. The marketing optimization module 101a optimizes an advertising campaign by performing one or more of the methods or processes, and not necessarily in such order, of generating an automated campaign, obtaining previous advertising campaign information from the online marketplace, obtaining API data that may be reports in the form of a table, the look-alike method, word screening, capital allocation, product targeting, generating a SKwC and/or a digital marketing solver (DMS) process (all of such processes or methods having been described in-detail previously). The marketing optimization module 101a also performs one or more of the steps described in the processes illustrated in FIGS. 1-4.

The machine learning module 102a-2 includes all and is capable of performing any of the features previously identified in connection with the descriptions of the machine learning software, the machine learning platform and/or the machine learning component. The machine learning module 102a-2 is configured to facilitate the production of a behavior curve or table, shown for example in FIGS. 5-23, by analyzing patterns in for example, the relationship between the bid, CPC, NOC, CVR, CTR and/or AdCS (as previously described above).

The network 105 can be a local area network, a wide area network or any type of network such as an intranet, an extranet, to provide controlled access to external users, for example, through the Internet, a private or public cloud network, the Internet, or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used.

Figure 25:
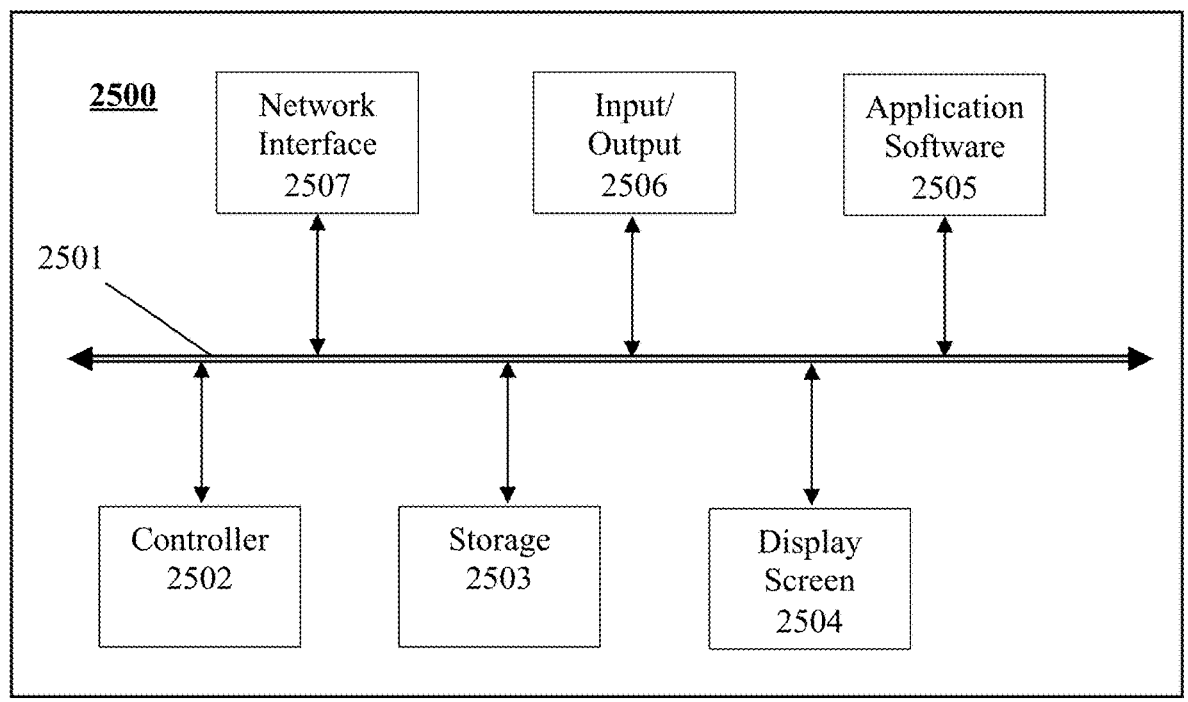
FIG. 25 shows a block diagram of an example of a computing device that can be configured to be a host terminal.

FIG. 25 shows an exemplary constitution of the host terminal 102 as shown in FIG. 24. In FIG. 25, terminal 2500 includes a controller or central processing unit 2402 that communicates with a number of other components, including memory 2503, display screen 2504, input/output 2506 such as keyboard, mouse, touch-pad, stylus, microphone and/or speaker with voice/speech interface and/or recognition software, network interface 2507, and application software 2505, by way of an internal bus 2501.

The storage 2503 can provide storage for program and data, and may include a combination of assorted conventional storage devices such as buffers, registers and memories, for example, read-only memory (ROM), programmable ROM (PROM), erasable PROM (EPROM), electrically erasable PROM (EEPROM), static random access memory (SRAM), dynamic random access memory (DRAM), and non-volatile random access memory (NOVRAM).

The network interface 2507 provides a connection, for example, by way of an Ethernet connection or other network connection which supports any desired network protocol such as, but not limited to, TCP/IP, IPX, IPX/SPX, and NetBEUI to the network to which the computer 2500 is connected, e.g., network 105 of FIG. 24.

Figure 26:
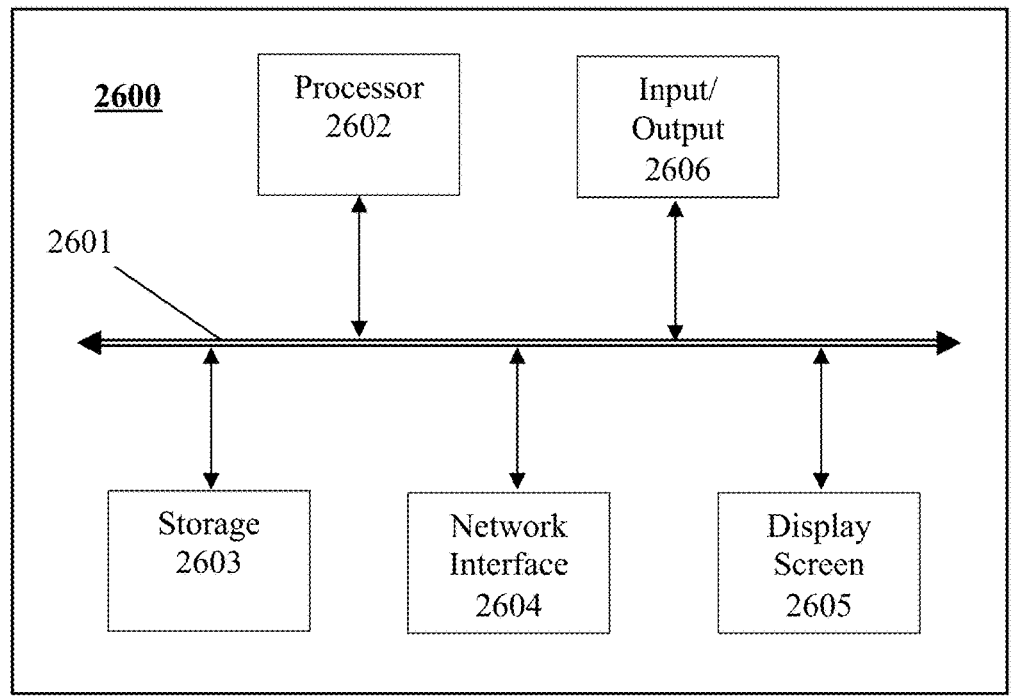
FIG. 26 shows a block diagram of an example of a computing device that can be configured as a marketplace system.

FIG. 26 shows an exemplary constitution of a computing device that can be configured, for example, through software, to operate at least in part as the marketplace system 101 of FIG. 24. As shown in FIG. 26, an apparatus 2600 includes a processor or central processing unit 302 that communicates with a number of other components, including memory or storage part 2603, network interface 2604, display screen 2605 and other input/output 2606, e.g., keyboard, mouse, by way of a system bus 2601.

The apparatus 2600 includes the network interface 2604 for communications through a network, such as communications through network 105 with the system of FIG. 24. However, it should be appreciated that the subject matter of this disclosure is not limited to such configuration. For example, the apparatus 2600 may communicate with client terminals through direct connections and/or through a network to which some components are not connected. As another example, the apparatus 2600 does not need to be provided by a server that services terminals, but rather may communicate with the devices on a peer basis, or in another fashion. The apparatus 2600 is not limited to a server or computer, but can be manifested in any of various devices that can be configured to communicate over a network and/or the Internet.

The embodiments and examples above are illustrative, and many variations can be introduced to them without departing from the spirit and scope of the disclosure or from the scope of the invention. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the drawings and descriptive matter, in which there is illustrated a preferred embodiment of the invention.

For example, the orders in which the steps are performed in the aforementioned methods and processes are not limited to those shown in the examples of FIGS. 1-4, and may be switched or substitute for each other as long as similar results are achieved. Also, it should be noted that the methods illustrated in the examples of FIGS. 1-4 may be implemented using the system of FIG. 24 or an equivalent thereof

What is claimed is:

1. A method of automatically producing an advertising campaign of a product for an online marketplace seller, the method performed by an application including one or more programs of instruction embodied in a non-transitory computer readable medium and executable by a processor to configure the application, comprising:

generating at least one automated advertising campaign of a product having an online marketplace listing with an online marketplace;

obtaining, in real time, a keyword table from the online marketplace, the keyword table including one or more keywords used in relation to the at least one automated advertising campaign and keyword data in connection with each of the one or more keywords, the keyword table being updated in real time by the online marketplace;

generating a single keyword advertising campaign of the product, wherein a single keyword of the single keyword advertising campaign is selected from the keyword table at least in part on the basis of the keyword data;

collecting data on the single keyword used in relation to the single keyword advertising campaign, the data including a second set of daily clicks or sales on the online marketplace listing;

executing a machine learning component of an adaptive machine learning platform to generate a machine learning component output, wherein the machine learning component output is generated based at least in part on the data on the single keyword used in relation to the single keyword advertising campaign;

generating a behavioral curve or table relating to an advertisement bid value of the online marketplace listing and a cost per click value associated with the online marketplace listing based at least in part on the machine learning component output of the machine learning component;

generating one or more sales goals of the product for the online marketplace seller on the online marketplace;

generating a current advertisement bid value based at least in part on the one or more sales goals and the behavioral curve or table;

generating a current advertising campaign of the product based at least in part on the optimized advertisement bid value; and generating an optimized advertisement bid value by continuously adjusting the current advertisement bid value until the current advertisement bid value has reached an optimized value, the continuous adjustment being performed by:

collecting data on the optimized advertising campaign, the data including a set of sales on the online marketplace listing;

generating an adjusted advertisement bid value based at least on one of the data relating to the optimized advertising campaign, the one or more sales goals and the behavioral curve or table; and generating an optimized advertising campaign of the product based at least in part on the adjusted advertisement bid value.

2. The method according to claim 1, further comprising: analyzing a keyword in the one or more reports to determine whether to promote the keyword to a single advertising campaign, maintain the keyword in the keyword table, or remove the keyword from the keyword table.

3. The method according to claim 2, wherein the analysis of the keyword is performed based on the keyword data in connection with the keyword.

4. The method according to claim 3, wherein the keyword data for the keyword includes at least one of a click-through rate of the keyword and the number of sales in connection with the click-through rate.

5. The method according to claim 2, wherein, in the case that the keyword is neither promoted to a single advertising campaign nor removed from the keyword table, the keyword is maintained in the keyword table until there is sufficient keyword data to perform another analysis of the keyword.

6. The method according to claim 2, wherein, in the case that the keyword is neither promoted to a single advertising campaign nor removed from the keyword table, the keyword is maintained in the keyword table while complying with any automated exclusion criteria defined by the seller.

7. The method according to claim 2, further comprising: modifying the keyword table based on the analysis of the keyword.

8. A method of automatically producing an advertising campaign of a product for an online marketplace seller, the method performed by an application including one or more programs of instruction embodied in a non-transitory computer readable medium and executable by a processor to configure the application, comprising:
- obtaining one or more prior advertising campaigns of a product generated by the seller in the online marketplace by connecting with an online marketplace account of the seller;
- generating at least one automated advertising campaign of the product having an online marketplace listing with an online marketplace using information from the one or more prior advertising campaigns;
- collecting data on one or more keywords used in relation to the at least one automated advertising campaign, the data including an initial set of daily clicks or sales on the online marketplace listing;
- generating a single keyword advertising campaign of the product, wherein a single keyword of the single keyword advertising campaign is selected from the one or more keywords at least in part on the basis of the initial set of daily clicks or sales on the online marketplace listing;
- collecting data on the single keyword used in relation to the single keyword advertising campaign, the data including a second set of daily clicks or sales on the online marketplace listing;
- executing a machine learning component of an adaptive machine learning platform to generate a machine learning component output, wherein the machine learning component output is generated based at least in part on the data on the single keyword used in relation to the single keyword advertising campaign;
- generating a behavioral curve or table relating to an advertisement bid value of the online marketplace listing and a cost per click value associated with the online marketplace listing based at least in part on the machine learning component output of the machine learning component;
- generating one or more sales goals of the product for the online marketplace seller on the online marketplace;
- generating a current advertisement bid value based at least in part on the one or more sales goals and the behavioral curve or table;
- generating a current advertising campaign of the product based at least in part on the optimized advertisement bid value; and
- generating an optimized advertisement bid value by continuously adjusting the current advertisement bid value until the current advertisement bid value has reached an optimized value, the continuous adjustment being performed by:
  - collecting data on the optimized advertising campaign, the data including a set of sales on the online marketplace listing;
  - generating an adjusted advertisement bid value based at least on one of the data relating to the optimized advertising campaign, the one or more sales goals and the behavioral curve or table; and
  - generating an optimized advertising campaign of the product based at least in part on the adjusted advertisement bid value.

9. The method according to claim 8, wherein the information from the one or more prior advertising campaigns includes one or more prior keywords used in the one or more prior advertising campaigns and prior keyword data in connection with the one or more prior keywords.

10. The method according to claim 9, wherein the prior keyword data includes a set of daily clicks or sales in the online marketplace listing in connection with the one or more prior keywords.

11. The method according to claim 10, wherein the prior keyword data further includes one or more of a number of impressions relating to the online marketplace listing, a total number of clicks on the online marketplace listing, a click-through rate, a conversion rate, a total number of advertisement-generated sales of the product, a total number of organic sales of the product, and a total number of sales of the product through the online marketplace listing.

12. The method according to claim 9, wherein the one or more prior keywords are included in the one or more keywords used in the at least one automated advertising campaign.

13. The method according to claim 12, further comprising:
- analyzing each keyword of the one or more keywords in the automated advertising campaign to determine whether to promote the keyword to a single advertising campaign, maintain the keyword in the at least one automated advertising campaign, or remove the keyword from the at least one automated advertising campaign.

14. The method according to claim 13, wherein, when a prior keyword of the one or more keywords used in the at least one automated campaign is analyzed to determine whether to promote the prior keyword to a single keyword advertising campaign, the analysis is performed based at least in part on the prior keyword data in connection with the prior keyword.

15. A method of automatically producing an advertising campaign of a product for an online marketplace seller, the method performed by an application including one or more programs of instruction embodied in a non-transitory computer readable medium and executable by a processor to configure the application, comprising:

obtaining information from one or more competitor products listed in the online marketplace by competitors to the seller;

generating at least one automated advertising campaign of a product having an online marketplace listing with an online marketplace based on the information obtained from the one or more competitor products;

collecting data on one or more keywords used in relation to the at least one automated advertising campaign, the data including an initial set of daily clicks or sales on the online marketplace listing;

generating a single keyword advertising campaign of the product, wherein a single keyword of the single keyword advertising campaign is selected from the one or more keywords at least in part on the basis of the initial set of daily clicks or sales on the online marketplace listing;

collecting data on the single keyword used in relation to the single keyword advertising campaign, the data including a second set of daily clicks or sales on the online marketplace listing;

executing a machine learning component of an adaptive machine learning platform to generate a machine learning component output, wherein the machine learning component output is generated based at least in part on the data on the single keyword used in relation to the single keyword advertising campaign;

generating a behavioral curve or table relating to an advertisement bid value of the online marketplace listing and a cost per click value associated with the online marketplace listing based at least in part on the machine learning component output of the machine learning component;

generating one or more sales goals of the product for the online marketplace seller on the online marketplace;

generating a current advertisement bid value based at least in part on the one or more sales goals and the behavioral curve or table;

generating a current advertising campaign of the product based at least in part on the optimized advertisement bid value; and generating an optimized advertisement bid value by continuously adjusting the current advertisement bid value until the current advertisement bid value has reached an optimized value, the continuous adjustment being performed by:

collecting data on the optimized advertising campaign, the data including a set of sales on the online marketplace listing;

generating an adjusted advertisement bid value based at least on one of the data relating to the optimized advertising campaign, the one or more sales goals and the behavioral curve or table; and generating an optimized advertising campaign of the product based at least in part on the adjusted advertisement bid value.

16. The method according to claim 15, wherein the one or more competitor products have features or characteristics that are similar to the product.

17. The method according to claim 16, wherein the information obtained from the one or more competitor products includes one or more competitor keywords used in one or more corresponding competitor advertising campaign and competitor keyword data in connection with the one or more competitor keywords.

18. The method according to claim 17, wherein the competitor keyword data includes a set of number of impressions, number of daily clicks, number of sales, or volume of sales in the online marketplace listing.

19. The method according to claim 17, wherein the one or more competitor keywords are included in the one or more keywords used in the at least one automated advertising campaign.

20. The method according to claim 17, further comprising:

determining a best-selling or highest-ranked competitor product of the one or more competitor products based on product sales information from the online marketplace;

selecting one or more competitor keywords used in one or more corresponding competitor advertising campaign for the best-selling or highest-ranked competitor product; and generating an automated advertising campaign using the one or more competitor keywords.

* * * * *